(12) United States Patent
Kudou et al.

(10) Patent No.: US 6,550,599 B2
(45) Date of Patent: Apr. 22, 2003

(54) MOTOR HAVING CLUTCH AND MANUFACTURING METHOD THEREOF

(75) Inventors: Takayuki Kudou, Toyohashi (JP); Masanori Koyama, Toyohashi (JP); Yoshimasa Tomida, Hamana-gun (JP)

(73) Assignee: Asmo Co., Ltd., Shizuoka (JP)

( * ) Notice: Subject to any disclaimer, the term of this patent is extended or adjusted under 35 U.S.C. 154(b) by 16 days.

(21) Appl. No.: 09/862,513

(22) Filed: May 23, 2001

(65) Prior Publication Data

US 2001/0047916 A1 Dec. 6, 2001

(30) Foreign Application Priority Data

Jun. 6, 2000 (JP) ......................................... 2000-168784

(51) Int. Cl.[7] ............................ H02K 5/00; H02K 7/112
(52) U.S. Cl. ........................ 192/223.2; 29/596; 310/42; 310/77; 310/83
(58) Field of Search ............................. 192/223.2, 38; 229/596; 310/83, 77, 78, 42; 74/89.14, 425

(56) References Cited

U.S. PATENT DOCUMENTS

| | | | | |
|---|---|---|---|---|
| 3,110,381 A | * | 11/1963 | Leu | .................... 192/223.2 |
| 3,694,909 A | * | 10/1972 | Hallerback | .................... 29/596 |
| 6,229,233 B1 | * | 5/2001 | Torii et al. | .................... 310/78 |
| 6,242,824 B1 | * | 6/2001 | Torii et al. | .................... 29/596 |
| 6,279,714 B1 | * | 8/2001 | Hsu | .................... 192/223.2 |
| 6,288,464 B1 | * | 9/2001 | Torii et al. | .................... 192/223.2 |
| 6,311,787 B1 | * | 11/2001 | Berry et al. | .................... 192/223.2 |

* cited by examiner

*Primary Examiner*—Rodney H Bonck
(74) *Attorney, Agent, or Firm*—Posz & Bethards, PLC

(57) ABSTRACT

A motor includes a motor main body, an output arrangement secured to the motor main body, and a clutch arranged between the motor main body and the output arrangement. The motor main body includes a rotatable shaft. The output arrangement includes a housing and a worm shaft. The clutch transmits rotation of the rotatable shaft to the worm shaft and prevents transmission of rotation of the worm shaft to the rotatable shaft. The worm shaft and a driven-side rotator of the clutch are installed in the housing. The worm shaft and the driven-side rotator can be separately provided or alternatively can be integrally provided as a one-piece member. Then, a driving-side rotator of the clutch is installed on the rotatable shaft. Thereafter, the motor main body is connected to the housing of the output arrangement.

15 Claims, 12 Drawing Sheets

MOTOR HAVING CLUTCH AND MANUFACTURING METHOD THEREOF

CROSS REFERENCE TO RELATED APPLICATION

This application is based on and incorporates herein by reference Japanese Patent Application No. 2000-168784 filed on Jun. 6, 2000 and Japanese Patent Application No. 2001-118997 filed on Apr. 18, 2001.

BACKGROUND OF THE INVENTION

1. Field of the Invention

The present invention relates to a motor having a rotatable rotor shaft (rotatable shaft) coupled with a worm shaft via a clutch and also to a manufacturing method of such a motor.

2. Description of Related Art

With reference to FIG. 12, one previously proposed motor used, for example, in a vehicle power window system includes a motor main body 82, an output arrangement 84 and a clutch 85 (FIG. 13). The motor main body 82 has a rotatable shaft 81 that is rotated upon energization of the motor. The output arrangement 84 has a worm shaft 83. The clutch 85 transmits rotation of the rotatable shaft 81 to the worm shaft 83 but prevents transmission of rotation of the worm shaft 83 to the rotatable shaft 81.

As shown in FIG. 13, the clutch 85 includes a driving-side rotator 86, a driven-side rotator 87, a collar 89 and rolling elements 90. The driving-side rotator 86 is secured to a distal end of the rotatable shaft 81 in non-rotatable relationship with respect to the rotatable shaft 81. The driven-side rotator 87 is securely connected to a base end of the worm shaft 83 in non-rotatable relationship with respect to the worm shaft 83. The collar 89 is secured to a gear housing 88 of the output arrangement 84 to surround both the driving-side rotator 86 and the driven-side rotator 87. The rolling elements 90 are positioned between the driven-side rotator 87 and the collar 89.

At an axial center of the driving-side rotator 86, there is provided an annular recess 86a having diametrically opposing flat inner surfaces. Furthermore, at the distal end of the rotatable shaft 81, there is provided an annular protrusion 81a having diametrically opposing flat outer surfaces. When the protrusion 81a is fitted within the recess 86a, the rotatable shaft 81 is secured to the driving-side rotator 86. The inner surfaces of the annular recess 86a are tapered such that a width of the recess 86a increases toward an opening (upper side in FIG. 13) of the recess 86a to facilitate insertion of the protrusion 81a into the recess 86a during assembly.

Protrusions 86b are formed on a worm shaft 83 side of the driving-side rotator 86 at predetermined angular positions at radially outward region of the driving-side rotator 86. Each protrusion 86b axially protrudes toward the worm shaft 83 and extends radially outwardly. A plurality of recesses 87a are formed at predetermined angular positions at a radially outward region of the driven-side rotator 87. A radially inward portion (where a rubber component G is arranged) of each protrusion 86b is received within the corresponding recess 87a of the driven-side rotator 87 in such a manner that a predetermined circumferential space is provided between each protrusion 86b and the corresponding recess 87a. Control surfaces 87b are provided in radially outer surfaces of protruded portions of the driven-side rotator 87 that are formed between the recesses 87a. A radial space between an inner peripheral surface of the collar 89 and each control surface 87b varies in a circumferential direction. Each rolling element 90 is arranged between the corresponding control surface 87b and the inner peripheral surface of the collar 89.

An annular disk portion 89a that extends radially inwardly is formed at one end (upper end in FIG. 13) of the collar 89. An annular cover plate 91 is fitted within the other end (lower end in FIG. 13) of the collar 89. The cover plate 91 and the annular disk portion 89a cooperate to limit axial relative movement of the driving-side rotator 86, the driven-side rotator 87 and the rolling elements 90. More specifically, an inner diameter of the annular disk portion 89a is selected such that the annular disk portion 89a prevents the driving-side rotator 86 to pass through it. Likewise, an inner diameter of the cover plate 91 is selected such that the cover plate 91 prevents the driven-side rotator 87 to pass through it. The other end of the collar 89 (lower end in FIG. 13) is securely fitted within a serrated annular groove 88a formed in the gear housing 88.

The motor having the above-described structure is assembled as follows.

First, with reference to FIG. 14, the driving-side rotator 86, the rolling elements 90 and the driven-side rotator 87 that is previously connected to the worm shaft 83 are inserted inside of the collar 89 from the other end of the collar 89. Then, the cover plate 91 is fitted to prevent these components from falling out of the collar 89. In this way, a clutch-worm shaft unit 92 is assembled. Then, a sensor magnet 93 that constitutes a rotational sensor is secured around a shaft portion of the driving-side rotator 86 which protrudes from the collar 89.

Next, the worm shaft 83 of the clutch-worm shaft unit 92 is received within a worm shaft receiving recess 88b defined within the gear housing 88. More specifically, the worm shaft 83 of the clutch-worm shaft unit 92 is received within a pair of metal bearings 94 retained within the worm shaft receiving recess 88b. During this process, the collar 89 of the clutch-worm shaft unit 92 is clamped by a human hand or chuck claws of a manufacturing device (not shown) to insert the worm shaft 83 of the clutch-worm shaft unit 92 into the worm shaft receiving recess 88b. Then, the other end of the collar 89 is fitted within the serrated annular groove 88a.

Thereafter, as shown in FIG. 15, a yoke 95 of the motor main body 82 is connected to the gear housing 88 of the output arrangement 84, and the protrusion 81a of the rotatable shaft 81 is fitted within the recess 86a of the driving-side rotator 86 to securely connect the rotatable shaft 81 to the driving-side rotator 86.

In the clutch 85 of the assembled motor, when the motor main body 82 is energized or driven to rotate the rotatable shaft 81 and thereby the driving-side rotator 86, each rolling element 90 is pushed by a radially outward portion of the corresponding protrusion 86b, and a wall surface of each recess 87a of the driven-side rotator 87 is pushed by a radially inward portion of the corresponding protrusion 86b. As a result, the driven-side rotator 87 and the worm shaft 83 are rotated by the driving-side rotator 86.

On the other hand, in a non-actuated state of the motor main body 82, if the driven-side rotator 87 is forcefully rotated along with the worm shaft 83, each rolling element 90 is clamped between the corresponding control surface 87b and the inner peripheral surface of the collar 89 to prevent further rotation of the driven-side rotator 87 (locked state).

While the driven-side rotator 87 is provided as the clutch-worm shaft unit 92 (i.e., while the driven-side rotator 87 is not installed in the gear housing 88), there is a small play between the driven-side rotator 87 and the other clutch components (such as driving-side rotator 86, cover plate 91 or the like), and thereby the driven-side rotator 87 can slightly tilt relative to the collar 89.

Thus, when the collar 89 of the clutch-worm shaft unit 92 is clamped to insert the worm shaft 83 within the metal bearings 94, the worm shaft 83 may swing freely, so that, for example, a worm 83a (tooth) of the worm shaft 83 may contact an inner peripheral surface of the corresponding metal bearing 94 (the contact surface between the worm shaft 83 and the metal bearing 94), resulting in damage to the inner peripheral surface of the metal bearing 94.

SUMMARY OF THE INVENTION

The present invention addresses the above described disadvantages. Thus, it is an objective of the present invention to provide a motor that has a rotatable shaft coupled with a worm shaft via a clutch and that allows installation of the worm shaft within a worm shaft receiving recess without inducing damage to the rest of the motor during assembly thereof. It is another objective of the present invention to provide a manufacturing method of such a motor. It is a further objective of the present invention to facilitate the manufacturing of such a motor and also to improve productivity of such a motor.

To achieve the objectives of the present invention, there is provided a method for manufacturing a motor that includes a motor main body, an output arrangement secured to the motor main body, and a clutch arranged between the motor main body and the output arrangement. The motor main body includes a rotatable shaft rotatably supported therein. The output arrangement includes a housing and a worm shaft rotatably supported within the housing. The clutch transmits rotation of the rotatable shaft to the worm shaft and prevents transmission of rotation of the worm shaft to the rotatable shaft. The method includes steps of installing the worm shaft and a driven-side rotator of the clutch in the housing of the output arrangement in such a manner that the worm shaft rotates integrally with the driven-side rotator of the clutch, installing a driving-side rotator of the clutch on the rotatable shaft in such a manner that the driving-side rotator rotates integrally with the rotatable shaft, and connecting the motor main body to the housing of the output arrangement in such a manner that the driving-side rotator is positioned in generally coaxial relationship with respect to the driven-side rotator and is drivingly engageable with the driven-side rotator.

In this method, the worm shaft can be installed in the housing of the output arrangement prior to installing the driven-side rotator of the clutch in the housing of the output arrangement in the step of installing the worm shaft and the driven-side rotator of the clutch. Alternatively, the worm shaft and the driven-side rotator of the clutch can be installed in the housing of the output arrangement as a one-piece member in the step of installing the worm shaft and the driven-side rotator of the clutch.

An annular collar and a rolling element of the clutch can be additionally installed in the housing of the output arrangement upon installing the driven-side rotator in the housing of the output arrangement before connecting the motor main body to the housing of the output arrangement. At the same stage, a support member of the clutch can be additionally installed in the housing of the output arrangement. In this case, the rolling element is first installed in and rotatably supported within the support member prior to being installed in the housing of the output arrangement.

Furthermore, in this method, the collar and the support member can be installed in the housing of the output arrangement while the collar and the support member are correctly positioned with respect to the driven-side rotator using a positioning jig. In this case, the collar and the support member may be correctly positioned with respect to the driven-side rotator in a rotational direction of the driven-side rotator by engaging the positioning jig with a positioning portion of the collar, a positioning portion of the support member and a positioning portion of the driven-side rotator, respectively.

Also, operation of the clutch can be tested just before the step of connecting the motor main body to the housing of the output arrangement. The operation of the clutch can be tested with an operation testing jig that is engageable with a rotational drive coupling portion of the driven-side rotator to rotate the driven-side rotator. The test may be conducted by inserting an operation testing jig along a installing direction of the driving-side rotator, engaging the operation testing jig with the rotational drive coupling portion, and directly rotating the driven-side rotator by the operation testing jig.

Furthermore, to achieve the objectives of the invention, there is provided a motor including a motor main body, an output arrangement secured to the motor main body, and a clutch arranged between the motor main body and the output arrangement. The motor main body includes a rotatable shaft rotatably supported therein. The output arrangement includes a housing and a worm shaft rotatably supported within the housing. The clutch transmits rotation of the rotatable shaft to the worm shaft and prevents transmission of rotation of the worm shaft to the rotatable shaft. The clutch includes a driven-side rotator, a driving-side rotator, an annular collar and a rolling element. The driven-side rotator rotates integrally with the worm shaft. The driving-side rotator is positioned in generally coaxial relationship with respect to the driven-side rotator and rotates integrally with the rotatable shaft. The driving-side rotator is drivingly engageable with the driven-side rotator. The annular collar is received in the housing of the output arrangement in non-rotatable relationship with respect to the housing and surrounds both the driving-side rotator and the driven-side rotator. The driven-side rotator includes a control surface facing an inner peripheral surface of the collar. The control surface is spaced from the inner peripheral surface of the collar for a distance that varies along a circumferential direction of the collar. A smallest inner diameter of the collar is larger than a largest outer diameter of the driving-side rotator, so that the driving-side rotator is axially detachably engageable with the driven-side rotator through the collar. The rolling element is positioned between the control surface of the driven-side rotator and the inner peripheral surface of the collar. The rolling element rotates integrally with the driven-side rotator when the driving-side rotator is rotated upon energization of the motor. The rolling element is clamped between the control surface of the driven-side rotator and the inner peripheral surface of the collar to prevent rotation of the driven-side rotator when the driven-side rotator is rotated by an external force.

The worm shaft can be formed separately from the driven-side rotator. Alternatively, the worm shaft and the driven-side rotator can be formed together as a one-piece member.

Furthermore, the clutch can further includes a support member for rotatably supporting the rolling element. The support member is rotatably supported within the housing of the output arrangement between the driven-side rotator and the collar.

Also, the driven-side rotator can include a rotational drive coupling portion for engaging with an operation testing jig for testing operation of the clutch.

Moreover, each one of the collar, the support member and the driven-side rotator can include a positioning portion for engaging with a positioning jig.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
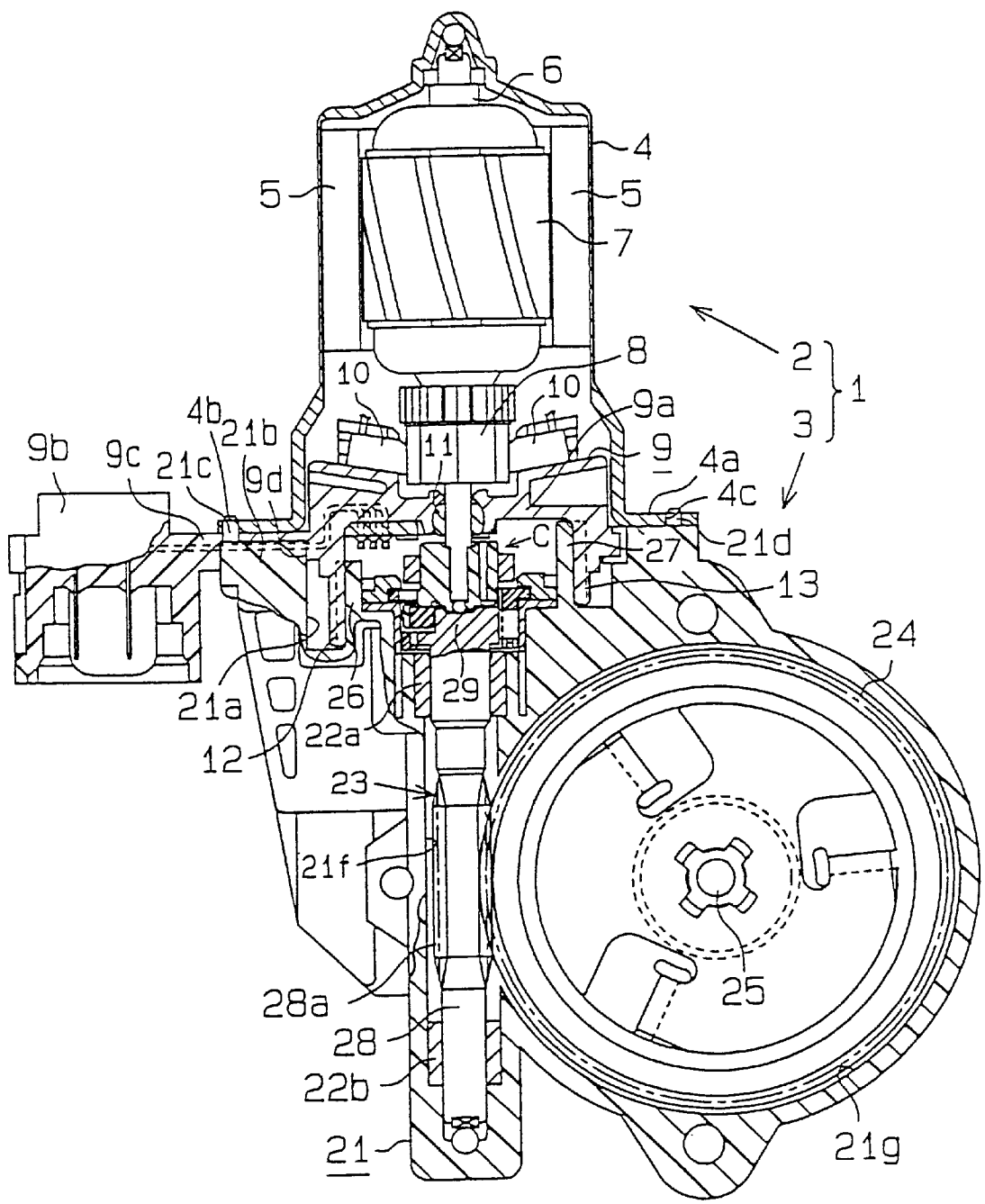
FIG. 1 is a schematic cross-sectional view of a motor according to a first embodiment of the present invention.
Figure 2:
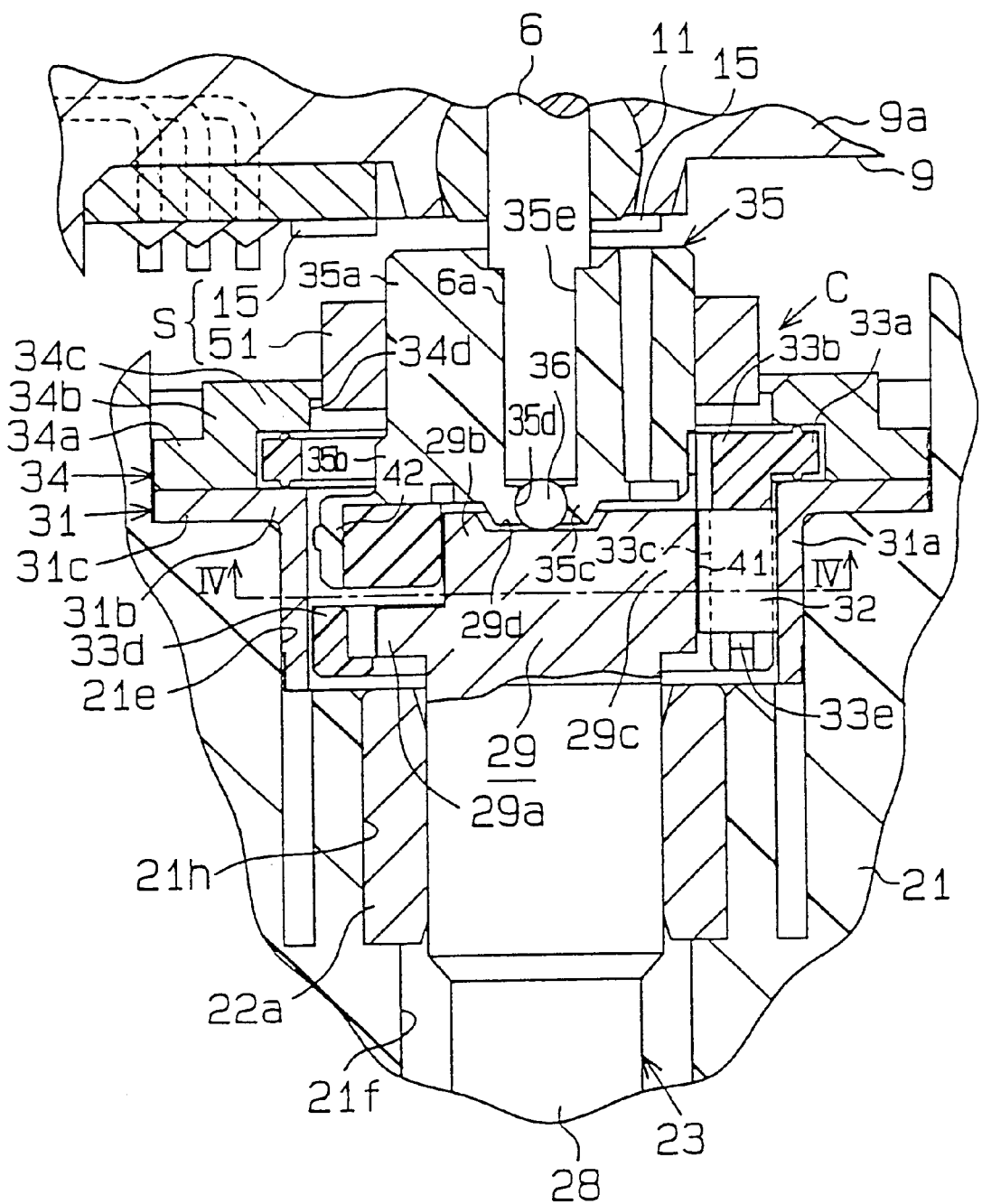
FIG. 2 is an enlarged partial cross-sectional view of the motor according to the first embodiment.

A motor of a power window system according to a first embodiment of the present invention will be described with reference to FIGS. 1–8. FIG. 1 is a cross-sectional view of the motor 1 according to the embodiment. The motor 1 includes a motor main body 2, an output arrangement 3 and a clutch C (FIG. 2).

As shown in FIG. 1, the motor main body 2 includes a yoke housing (hereinafter simply referred as the yoke) 4, a plurality of magnets 5, a rotatable shaft 6, an iron core 7 wound with coils, a commutator 8, a resin brush holder 9 and power supplying brushes 10.

The yoke 4 is formed into a generally oblate cylindrical shape having a base. Two magnets 5 are secured to an inner peripheral surface of the yoke 4 in such a manner that the magnets 5 diametrically oppose each other. A base end of the rotatable shaft 6 is rotatably supported at the base of the yoke 4 along a central axis of the yoke 4. As shown in FIG. 2, an annular protrusion 6a having diametrically opposing flat outer surfaces is formed at a distal end of the rotatable shaft 6.

The core 7 wound with the coils is secured to a middle part of the rotatable shaft 6 to oppose the magnets 5. The commutator 8 is secured to the rotatable shaft 6 at a position distal to the core 7.

A flange 4a extends radially outwardly from an open end of the yoke 4 and has two holes 4b and 4c that penetrate through the flange 4a. The brush holder 9 is received within and secured to the open end of the yoke 4. The brush holder 9 has a shape corresponding to that of the open end of the yoke 4. The brush holder 9 includes a holder main body 9a and a connector 9b. The holder main body 9a is configured to substantially cover the open end of the yoke 4. The connector 9b protrudes radially outwardly from the flange 4a. Two brushes 10 are provided on an interior side of the holder main body 9a facing an interior of the yoke 4 and are connected to the connector 9b through undepicted wiring. A bearing 11 is arranged at substantially a center of the holder main body 9a to rotatably support a distal end side of the rotatable shaft 6.

At a connecting portion 9c that connects the holder main body 9a of the brush holder 9 to the connector 9b, there is formed a recess 9d that is recessed on the output arrangement 3 side (bottom side in FIG. 1) of the connecting portion 9c.

A pair of first engaging projections 12 and 13 are formed on the yoke 4 exterior side (output arrangement 3 side) of the holder main body 9a. The first engaging projections 12 and 13 extend parallel to the rotatable shaft 6. A Hall IC 15 that constitutes a rotational sensor S is secured to the yoke 4 exterior side (output arrangement 3 side) of the holder main body 9a, as shown in FIG. 2.

The brushes 10 are placed adjacent to the commutator 8 to contact the commutator 8. With this arrangement, when electric current is supplied to the coils wound around the iron core 7 through the brushes 10 and the commutator 8 from an undepicted control device (external power source) connected to the connector 9b, the iron core 7 or the rotatable shaft 6 of the motor main body 2 is rotated.

The output arrangement 3 includes a gear housing 21, first and second bearings 22a, 22b, a worm member 23, a worm wheel 24 and an output shaft 25.

At a center of the top end (top end in FIG. 1) of the gear housing 21, there is formed an open end recess 21a. A protrusion 21b that can be received in the recess 9d of the brush holder 9 is formed at the top end of the gear housing 21. Furthermore, a projection 21c that can be fitted into the through hole 4b of the yoke 4 is formed on the protrusion 21b. Also, in the top end of the gear housing 21, there is formed another projection 21d that is fitted into the other through hole 4c of the yoke 4. The gear housing 21 is secured to the yoke 4 with screws (not shown) while the projections 21c and 21d are received within the corresponding through holes 4b and 4c of the yoke 4, respectively.

The gear housing 21 further includes a clutch receiving recess 21e (FIGS. 2 and 3) and a worm shaft receiving recess 21f. The clutch receiving recess 21e is recessed from a base of the open end recess 21a at a center thereof in the axial direction of the rotatable shaft 6. The worm shaft receiving recess 21f is recessed from a base of the clutch receiving recess 21e at a center thereof in the axial direction of the rotatable shaft 6. The gear housing 21 further includes a wheel receiving chamber 21g that is communicated with the worm shaft receiving recess 21f in a direction (right direction in FIG. 1) perpendicular to an axial direction of the worm shaft receiving recess 21f at an axially middle portion of the worm shaft receiving recess 21f. A bearing receiving recess 21h (FIG. 2) is formed at an open end of the worm shaft receiving recess 21f.

Furthermore, at the base of the open end recess 21a, a pair of second engaging projections 26 and 27 are provided. Both the second engaging projections 26 and 27 extend parallel to the axial direction of the rotatable shaft 6. Also, each second engaging projection 26 or 27 has a horseshoe-shaped cross section and surrounds the corresponding first engaging projection 12 or 13, as shown in FIG. 3.

The first and second bearings 22a and 22b are radial bearings made of a metal material (metal bearings). The first bearing 22a is fitted within the bearing receiving recess 21h. The second bearing 22b is secured to an inner peripheral surface of a base portion (bottom side in FIG. 1) of the worm shaft receiving recess 21f.

Figure 3:
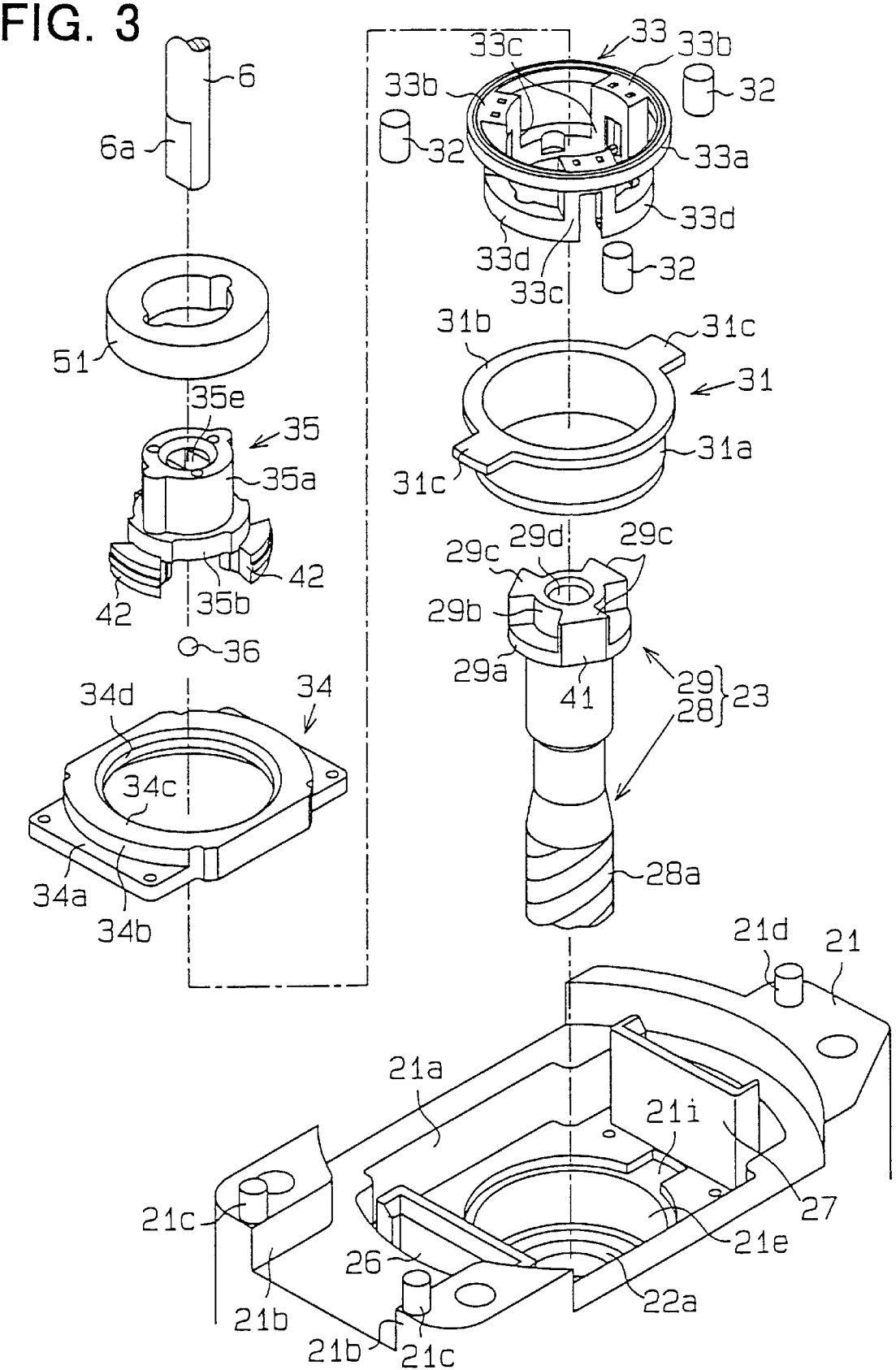
FIG. 3 is an exploded perspective view of a clutch according to the first embodiment.

The worm member 23 includes a worm shaft 28 and a driven-side rotator 29 that is integrally formed with the worm shaft 28 on a motor main body 2 side of the worm shaft 28, as shown in FIG. 3. The worm shaft 28 has a worm 28a in the axially middle part thereof. Furthermore, the worm shaft 28 is rotatably supported by the first and second bearings 22a, 22b at its opposing ends and is received within the worm shaft receiving recess 21f.

The worm wheel 24 is meshed with the worm 28a and is received within the wheel receiving chamber 21g in such a manner that the worm wheel 24 is allowed to rotate about its rotational axial that extends in a direction perpendicular to the worm shaft 28 (direction perpendicular to the drawing surface in FIG. 1). The output shaft 25 is connected to the worm wheel 24 in such a manner that the output shaft 25 rotates about the same rotational axis as the worm wheel 24 when the worm wheel 24 is rotated. The output shaft 25 is connected to a window glass (not shown) via a known regulator.

Figure 4:
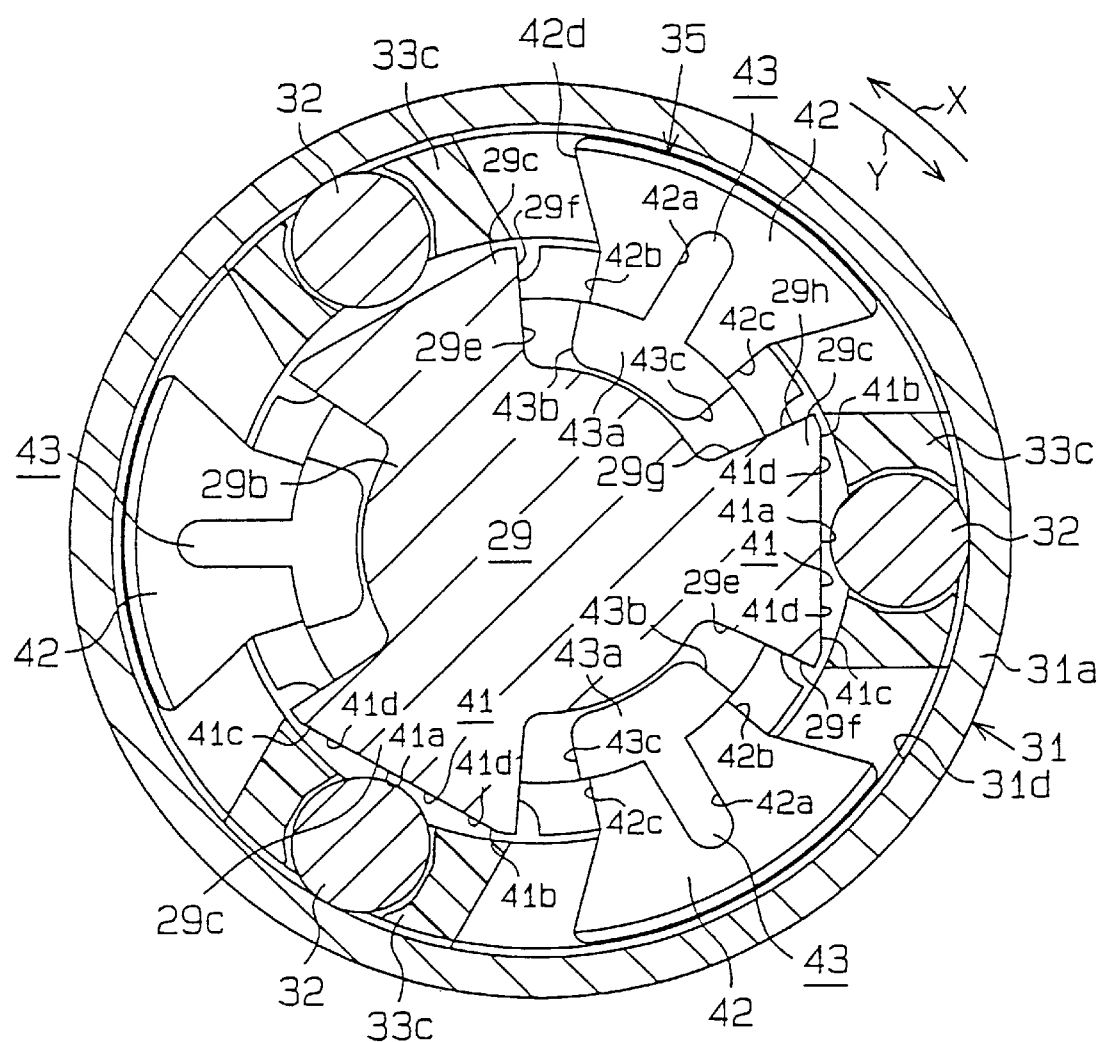
FIG. 4 is a cross-sectional view taken along line IV—IV in FIG. 2.

The rotatable shaft 6 is connected to the worm shaft 28 via the clutch C. As shown in FIGS. 2–4, the clutch C includes the driven-side rotator 29, a collar 31, a plurality (three in this embodiment) of rolling elements 32, a support member 33, a plate cap 34, a driving-side rotator 35 and a ball 36. The collar 31 includes a cylindrical outer ring 31a, an annular flange portion 31b and a pair of protrusions 31c. The annular flange portion 31b extends radially outwardly from one end (upper end in FIG. 2) of the cylindrical outer ring 31a. The protrusions 31c are angularly spaced 180 degrees apart from each other and protrude radially outwardly from the flange portion 31b. A smallest inner diameter of the collar 31 is larger than a largest outer diameter of the driving-side rotator 35.

The outer ring 31a of the collar 31 is fitted within the clutch receiving recess 21e. Each protrusion 31c is fitted within a corresponding fitting portion 21i (FIG. 3) formed in the gear housing 21 to prevent rotation of the protrusion 31c. The driven-side rotator 29 is placed inside of the collar 31.

As shown in FIG. 3, the driven-side rotator 29 includes a disk portion 29a, a shaft portion 29b and three engaging projections 29c. The disk portion 29a has an outer diameter larger than an outer diameter of a base end of the worm shaft 28. The shaft portion 29b axially extends from an axial center of the disk portion 29a on the motor main body 2 side (rotatable shaft 6 side) thereof. The engaging projections 29c extend radially outwardly from the shaft portion 29b and are spaced at equal angular intervals (120 degrees). Each engaging projection 29c has a increasing circumferential width that increases toward a radially distal end thereof. A radially outer surface of each engaging projection 29c constitutes a substantially flat control surface 41 that is spaced from an inner peripheral surface 31d of the outer ring 31a of the collar 31 for a distance that varies along a circumferential direction of the collar 31, as shown in FIG. 4. With reference to FIGS. 2 and 3, a circular recess 29d is formed at an axial center of the shaft portion 29b on the motor main body 2 side (rotatable shaft 6 side) thereof.

With reference to FIG. 4, each rolling element 32 is made of a metal material and is shaped into a generally cylindrical shape. Furthermore, each rolling element 32 is arranged between the control surface 41 of the engaging projection 29c and the inner peripheral surface 31d of the outer ring 31a. An outer diameter of the rolling element 32 is smaller than a distance between a center portion (circumferential center) 41a of the control surface 41 and the inner peripheral surface 31d of the outer ring 31a but is longer than a distance between each one of end portions (circumferential ends) 41b, 41c of the control surface 41 and the inner peripheral surface 31d of the outer ring 31a. Specifically, the outer diameter of the rolling element 32 is equal to a distance between the inner peripheral surface 31d of the outer ring 31a and each intermediate portion 41d located between the center portion 41a and each circumferential end 41b or 41c.

The support member 33 rotatably supports the rolling elements 32 spaced at substantially equal angular intervals in generally parallel relationship. More specifically, as shown in FIGS. 2 and 3, the support member 33 is made of a resin material and includes a ring plate 33a, three inward protrusions 33b, three pairs of roller supports 33c and three connectors 33d. The ring plate 33a is formed into an annular shape having an outer diameter larger than that of the outer ring 31a. The inward protrusions 33b extend radially inwardly from an inner peripheral surface of the ring plate 33a and are spaced at equal angular intervals. Each roller support 33c extends axially from a corresponding circumferential end of the corresponding inward protrusion 33b at radially inward of the inward protrusion 33b. Each connector 33d is formed into an arcuate shape that connects one roller support 33c of one pair to the following roller support 33c of the next pair. In each pair of roller supports 33c, two circumferentially opposing engaging projections 33e are formed in distal ends of the roller supports 33c. Each rolling element 32 is held between the paired roller supports 33c and also between the inward protrusion 33b and the opposing engaging projections 33e in such a manner that the rolling element 32 is immovable with respect to the ring plate 33a in a circumferential direction and also in an axial direction. The support member 33, which holds the rolling elements 32 in the above-described manner, is positioned such that each roller support 33c is inserted inside of the outer ring 31a to position each rolling element 32 between the corresponding control surface 41 and the inner peripheral surface 31d of the outer ring 31a, and the ring plate 33a abuts the flange portion 31b.

The plate cap 34 includes a securing portion 34a, a cylindrical portion 34b and an annular disk portion 34c. The securing portion 34a has an outer shape corresponding to a shape of the open end recess 21a formed between the second engaging projections 26 and 27. The cylindrical portion 34b axially extends from a peripheral edge of a center hole formed in the securing portion 34a on the motor main body side (upper side in FIG. 2). The annular disk portion 34c extends radially inwardly from a distal end of the cylindrical portion 34b. An inner diameter of the cylindrical portion 34b (center hole) is substantially the same as an outer diameter of the flange portion 31b. An inner diameter of the annular disk portion 34c is substantially the same as an inner diameter of the outer ring 31a. The securing portion 34a of the plate cap 34 is secured to the base of the open end recess 21a such that the securing portion 34a abuts the protrusions 31c of the collar 31 to prevent the collar 31 from coming out of the clutch receiving recess 21e, and the annular disk portion 34c abuts the ring plate 33a of the support member 33 to prevent the support member 33 from coming out of the outer ring 31a.

The driving-side rotator 35 is made of a resin material and includes a shaft portion 35a, a disk portion 35b and a protruding portion 35c. The disk portion 35b has an outer diameter larger than an outer diameter of the shaft portion 35a. The protruding portion 35c protrudes from an axial center of the disk portion 35b in the axial direction (toward the bottom side in FIG. 2).

In the driving-side rotator 35, a ball receiving recess 35d extends from a distal end of the protruding portion 35c. The ball receiving recess 35d is formed by recessing a surrounding wall in a direction perpendicular to the axial direction to provide a spherical shape. The ball receiving recess 35d axially extends into a portion of the disk portion 35b. The ball 36 is held in the ball receiving recess 35d such that a portion of the ball 36 protrudes from the distal end of the protruding portion 35c.

At the axial center of the driving-side rotator 35, an annular recess 35e having diametrically opposing flat inner surfaces extends from a base end (upper end in FIG. 2) of the shaft portion 35a and communicates with the ball receiving recess 35d. The driving-side rotator 35 is connected to the rotatable shaft 6 in non-rotatable relationship therewith by engaging the annular protrusion 6a of the rotatable shaft 6 to the annular recess 35e. The protruding portion 35c is substantially received within the recess 29d of the driven-side rotator 29. The ball 36, which partially protrudes from the distal end of the protruding portion 35c, contacts a base of the recess 29d.

As shown in FIG. 4, a plurality (three in this embodiment) of generally fan-shaped protrusions 42 protrude radially outwardly on the distal end side (bottom side in FIG. 2) of the disk portion 35b of the driving-side rotator 35. The protrusions 42 are spaced at substantially equal angular intervals. Each protrusion 42 extends in the axial direction. Furthermore, each protrusion 42 includes an arcuate surface that extends along the inner peripheral surface 31d of the outer ring 31a and that has a radius of curvature slightly smaller than that of the inner peripheral surface 31d of the outer ring 31a, as shown in FIG. 4. That is, the driving-side rotator 35 is constructed such that the protrusions 42 can be inserted in the axial direction through a center hole 34d of the annular disk portion 34c of the plate cap 34. In each protrusion 42, a coupling groove 42a extends halfway from an inner peripheral surface of each protrusion 42 in a radially outward direction. Each protrusion 42 is arranged between the engaging projections 29c of the driven-side rotator 29 and also between the rolling elements 32 (roller supports 33c) within the outer ring 31a.

A cushion member 43 made of a rubber material is securely coupled to the coupling groove 42a of each protrusion 42. A cushion segment 43a is formed in the cushion member 43. Each cushion segment 43a extends radially inwardly from the coupling groove 42a of each protrusion 42 and also extends in the circumferential direction.

As shown in FIG. 4, a circumferential width of each cushion segment 43a is slightly longer than a circumferential width of an inner peripheral surface of the corresponding protrusion 42.

One side surface (counter-clockwise side surface) 43b of each cushion segment 43a engages a first cushion surface 29e that is formed at a radially inward region of a clockwise side surface of the engaging projection 29c when the driving-side rotator 35 is rotated to a predetermined position in the counter-clockwise direction (the direction of an arrow X) relative to the driven-side rotator 29. One side surface (counter-clockwise side surface) 42b formed at a radially inward region of the protrusion 42 engages a first engaging surface 29f formed at a radially outward region of the clockwise side surface of the engaging projection 29c when the driving-side rotator 35 is further rotated in the counter-clockwise direction (the direction of the arrow X) beyond the predetermined position. Since the cushion segment 43a is deformed in the circumferential direction, the driving-side rotator 35 is allowed to rotate beyond the predetermined position in the counter-clockwise direction (the direction of the arrow X), as shown in FIG. 5.

The other side surface (counter-clockwise side surface) 43c of each cushion segment 43a engages a second cushion surface 29g that is formed at a radially inward region of a counter-clockwise side surface of the engaging projection 29c when the driving-side.rotator 35 is rotated to a predetermined position in the clockwise direction (direction of an arrow Y) relative to the driven-side rotator 29. The other side surface (clockwise side surface) 42c formed at the radially inward region of the protrusion 42 engages a second engaging surface 29h formed at a radially outward region of the counter-clockwise side surface of the engaging projection 29c when the driving-side rotator 35 is further rotated in the clockwise direction (the direction of the arrow Y) beyond the predetermined position. Since the cushion segment 43a is deformed in the circumferential direction, the driving-side rotator 35 is allowed to rotate beyond the predetermined position in the clockwise direction (the direction of the arrow Y).

Figure 5:
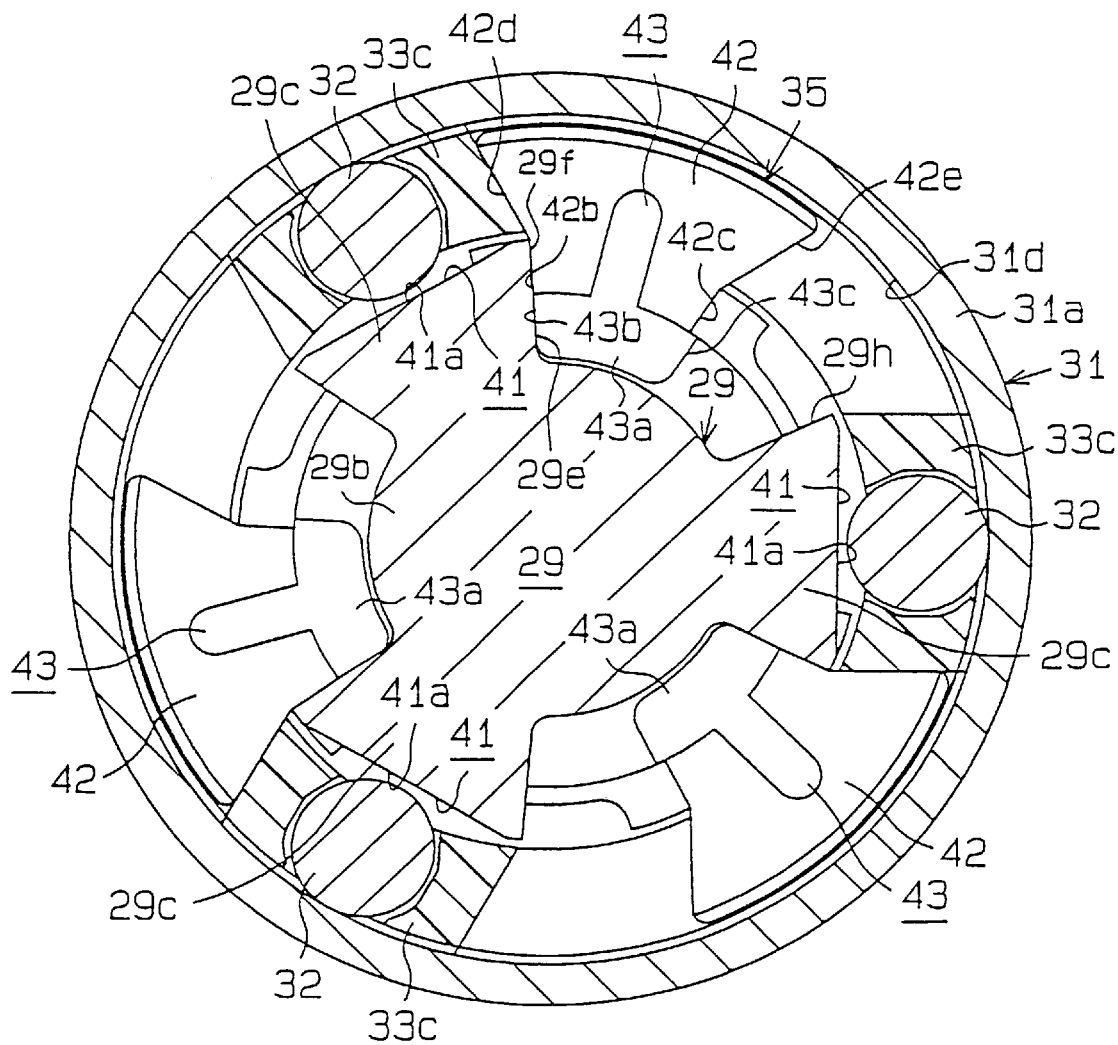
FIG. 5 is a cross-sectional view similar to FIG. 4, showing operation of the clutch according to the first embodiment.

With reference to FIG. 5, each component 32, 42, 29c, 33c is configured such that each rolling element 32 is placed at the center portion 41a of the corresponding control surface 41 when the one side surface 42b of the corresponding protrusion 42 engages the first engaging surface 29f of the engaging projection 29c, and a first urging surface 42d formed at the radially outward region of the counter-clockwise side surface of the protrusion 42 engages the corresponding roller support 33c.

Each component 32, 42, 29c, 33c is also configured such that each rolling element 32 is placed at the center portion 41a of the corresponding control surface 41 when the other side surface 42c of the corresponding protrusion 42 engages the second engaging surface 29h of the engaging projection 29c, and a second urging surface 42e formed at the radially outward region of the clockwise side surface of the protrusion 42 engages the corresponding roller support 33c.

As shown in FIG. 2, an annular sensor magnet 51 that constitutes the rotational sensor S in cooperation with the Hall ICs 15 is secured to an outer peripheral surface of the shaft portion 35a of the driving-side rotator 35. Each Hall IC 15 is axially aligned with and opposes a portion of an outer peripheral edge of the sensor magnet 51 such that the Hall IC 15 generates a pulse signal corresponding with a rotational speed of the sensor magnet 51 or a rotational speed of the rotatable shaft 6 and outputs it to the control device. The control device controls the electric current to be supplied based on the pulse signal.

The motor 1 having the above-described structure is assembled as follows.

(Worm Shaft Installing Step)

Figure 7:
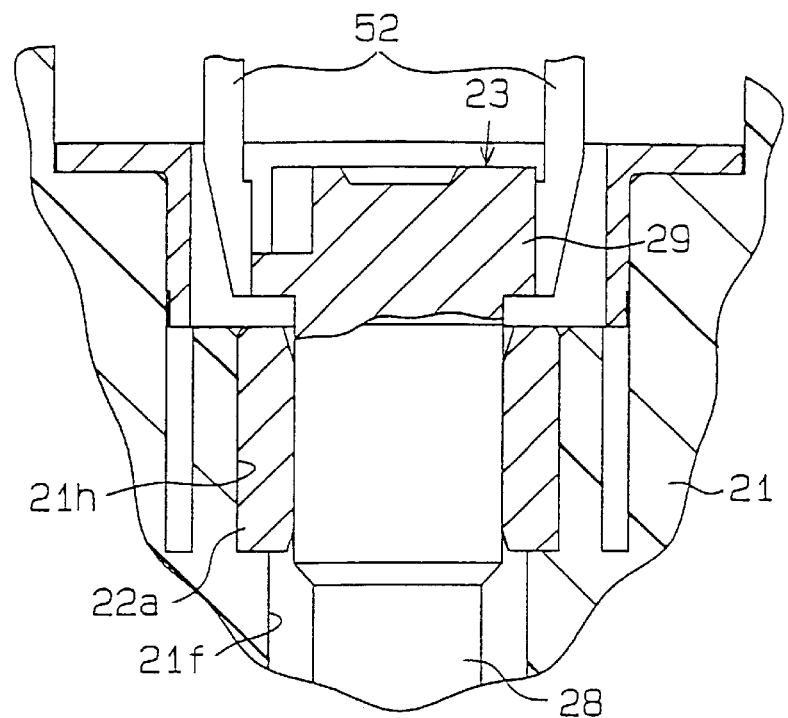
FIG. 7 is a partial longitudinal cross-sectional view of the motor according to the first embodiment, depicting a method for manufacturing the motor.

As shown in FIG. 7, the worm member 23 (one-piece body having the worm shaft 28 and the driven-side rotator 29) is installed in the gear housing 21. That is, the worm shaft 28 of the worm member 23 is inserted into the worm shaft receiving recess 21f and is held within the first and second bearings 22a and 22b. In the present embodiment, the driven-side rotator 29 is clamped by chuck claws 52 of a manufacturing device (not shown) and is moved in the axial direction to insert the worm shaft 28 within the first and second bearings 22a and 22b.

(Clutch Installing Step)

The clutch C without the driven-side rotator 29 is installed in the gear housing 21. "The clutch installing step" according to the present embodiment includes "driving-side rotator installing step", "housing-side component installing step" and "connecting step".

(Driving-side Rotator Installing Step)

The driving-side rotator 35 is installed on the rotatable shaft 6. More specifically, the protrusion 6a of the rotatable shaft 6 is fitted within the annular recess 35e of the driving-side rotator 35. In the present embodiment, the sensor magnet 51 is secured to the shaft portion 35a of the driving-side rotator 35 prior to conducting this step.

(Housing-side Component Installing Step)

The components of the clutch C other than the driven-side rotator 35 are installed in the gear housing 21. More specifically, the outer ring 31a of the collar 31 is fitted within the clutch receiving recess 21e, and the protrusions 31c are fitted within the corresponding fitting portions 21i (FIG. 3). Then, the rolling elements 32 are received and are held within the support member 33 which is, in turn, inserted inside of the outer ring 31a. The securing portion 34a of the plate cap 34 is secured to the base of the open end recess 21a such that the securing portion 34a of the plate cap 34 abuts the protrusions 31c of the collar 31 to prevent the collar 31 from coming out of the clutch receiving recess 21e, and the annular disk portion 34c abuts the ring plate 33a of the support member 33 to prevent the support member 33 from coming out of the outer ring 31a.

(Connecting Step)

Figure 8:
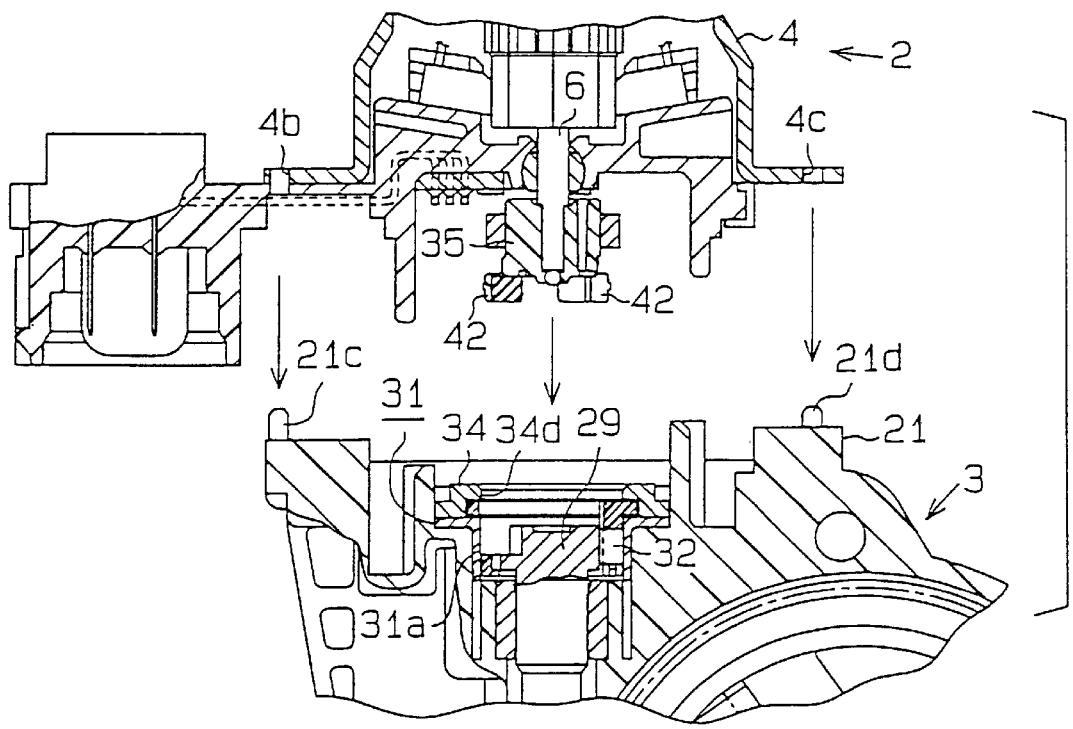
FIG. 8 is an exploded partial longitudinal cross-sectional view of the motor according to the first embodiment, depicting the method for manufacturing the motor.

Upon completing the above-described "driving-side rotator installing step" and "housing-side component installing step," the motor main body 2 is secured to the output arrangement 3, and the driving-side rotator 35 is connected to the other components of the clutch C. More specifically, as shown in FIG. 8, the projections 21c and 21d of the gear housing 21 are received within the corresponding through holes 4b and 4c of the yoke 4, respectively. Furthermore, the protrusions 42 of the driving-side rotator 35 are received inside of the outer ring 31a of the collar 31 (specifically, between the engaging projections 29c of the driven-side rotator 29 and also between the rolling elements 32) through the center hole 34d of the plate cap 34. As mentioned before, since the smallest inner diameter of the collar 31 is larger than the largest outer diameter of the driving-side rotator 35, the driving-side rotator 35 is axially detachably engageable with the driven-side rotator through the collar 31. In the present embodiment, upon completion of this step, the yoke 4 and the gear housing 21 are secured together with screws (not shown).

The power window system (motor 1) having the above-described structure operates as follows.

When the motor main body 2 is driven to rotate the rotatable shaft 6 in the counter-clockwise direction (the direction of the arrow X) in FIG. 4, the driving-side rotator 35 (protrusions 42) is rotated integrally with the rotatable shaft 6 in the same direction (the direction of the arrow X). Then, as shown in FIG. 5, when the one side surface 42b of each protrusion 42 engages the first engaging surface 29f of the corresponding engaging projection 29c, and the first urging surface 42d of the protrusion 42 engages the corresponding roller support 33c, the corresponding rolling element 32 is positioned in the center portion 41a of the corresponding control surface 41 (this position is hereinafter called a "neutral position").

Prior to the engagement of the one side surface 42b of the protrusion 42 with the first engaging surface 29f, the one side surface 43b of the corresponding cushion segment 43a engages the first cushion surface 29e of the corresponding engaging projection 29c to reduce the shocks generated by the engagement.

At this neutral position, each rolling element 32 is not clamped between the corresponding control surface 41 of the engaging projection 29c and the inner peripheral surface 31d of the outer ring 31a, so that the driven-side rotator 29 is allowed to rotate relative to the collar 31. Thus, when the driving-side rotator 35 is further rotated in the counter-clockwise direction, the rotational force of the driving-side rotator 35 is transmitted to the driven-side rotator 29 via the protrusions 42, so that the driven-side rotator 29 is rotated along with the driving-side rotator 35. At this time, the rotational force is applied to each rolling element 32 from the corresponding first urging surface 42d in the same direction (the direction of the arrow X), so that the rolling element 32 is moved in this direction.

On the other hand, when the rotatable shaft 6 is rotated in the clockwise direction (the direction of the arrow Y) in FIG. 4, each rolling element 32 is positioned in the neutral position by the protrusion 42. At this neutral position, each rolling element 32 is not clamped between the corresponding control surface 41 of the engaging projection 29c and the inner peripheral surface 31d of the outer ring 31a, so that the driven-side rotator 29 is allowed to rotate relative to the collar 31. Thus, the rotational force of the driving-side rotator 35 is transmitted to the driven-side rotator 29 through the protrusions 42, so that the driven-side rotator 29 is rotated along with the driving-side rotator 35.

Thus, the rotation of the driven-side rotator 29 causes the worm shaft 28 to be rotated, and thereby rotating the worm wheel 24 and the output shaft 25. As a result, the window glass connected to the output shaft 25 is moved downward or upward.

Figure 6:
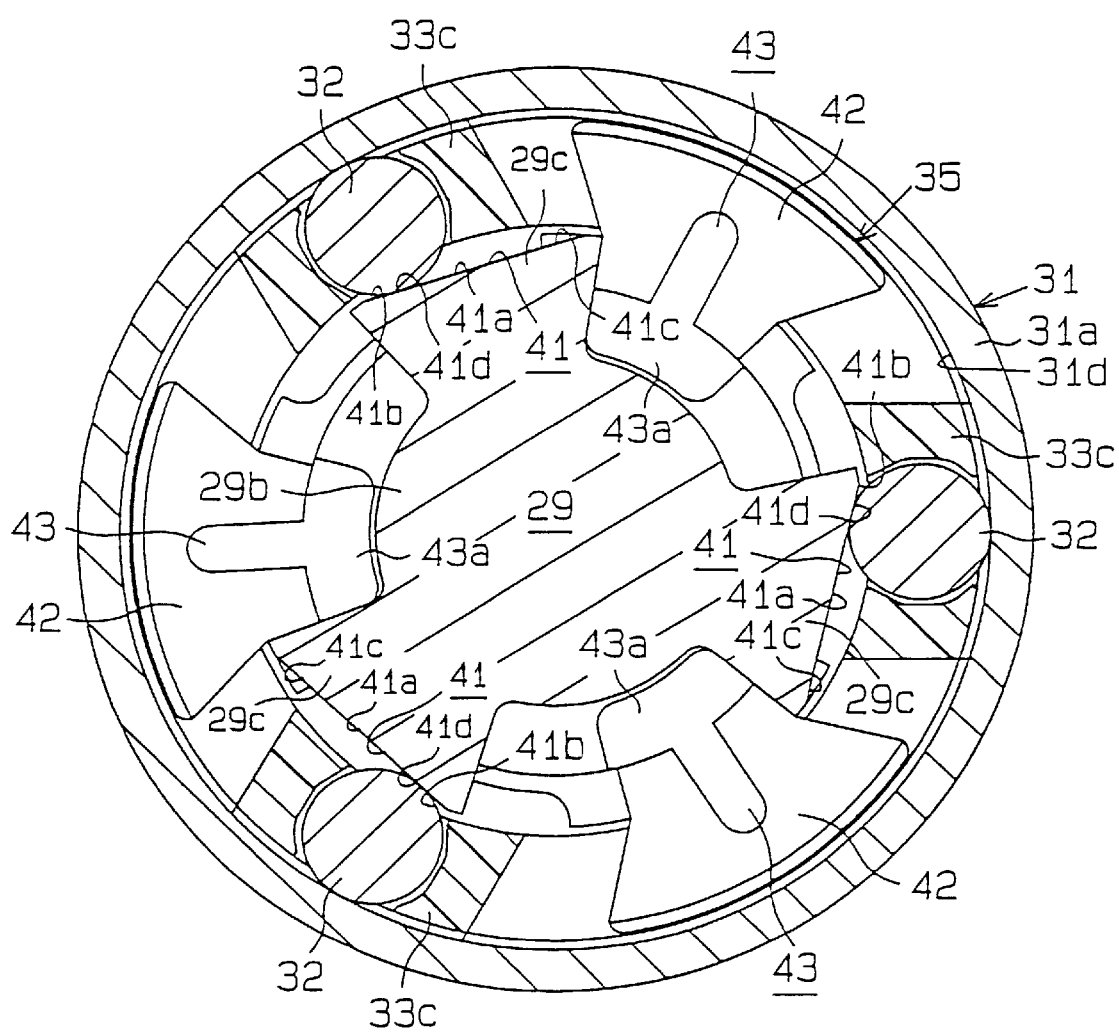
FIG. 6 is another cross-sectional view similar to FIGS. 4 and 5, showing the operation of the clutch according to the first embodiment.

When the motor 1 is not actuated, a load applied to the output shaft 25 causes the driven-side rotator 29 to rotate. Then, when the driven-side rotator 29 is rotated by the load in the clockwise direction (the direction of the arrow Y) in FIG. 4, each rolling element 32 moves toward the circumferential end 41b (more specifically, toward the intermediate portions 41d) of the corresponding control surface 41 of the engaging projection 29c. Then, as shown in FIG. 6, when the rolling element 32 reaches the intermediate portion 41d, the rolling element 32 is clamed between the control surface 41 and the inner peripheral surface 31d of the outer ring 31a (locked state). Since the outer ring 31a is securely held, the driven-side rotator 29 cannot be rotated further, so that the driving-side rotator 35 cannot be rotated by the driven-side rotator 29.

On the other hand, when the driven-side rotator 29 is rotated in the counter-clockwise direction (the direction of the arrow X) in FIG. 4, each rolling element 32 moves toward the circumferential end 41c (more specifically, toward the intermediate portions 41d) of the corresponding control surface 41 of the engaging projection 29c due to the fact that the driving-side rotator 35 is stopped. Then, when the rolling element 32 reaches the intermediate portion 41d, the rolling element 32 is clamped between the control surface 41 and the inner peripheral surface 31d of the outer ring 31a (locked state).

Since the outer ring 31a is securely held, the driven-side rotator 29 cannot be rotated further, so that the driving-side rotator 35 cannot be rotated by the driven-side rotator 29.

As described above, even if a large load is applied to the output shaft 25, the rotation of the driven-side rotator 29 is prevented. Thus, the window glass that is connected to the output shaft 25 is effectively prevented from moving upward and downward by its own weight or an external force.

Characteristic advantages of the first embodiment will be described below.

(1) The worm member 23 (one-piece body including the worm shaft 28 and the driven-side rotator 29) is constructed to be installable in the gear housing 21. The worm member 23 is installed in the gear housing 21 as the one-piece body. Thus, the worm shaft 28 does not swing freely when the worm shaft 28 is inserted and is held within the first and second bearings 22a and 22b. That is, during the installation of the worm shaft 28, the worm shaft 28 can be moved linearly along the axial direction. Thus, the component of the worm member 23, such as the worm 28a, does not damage the first and second bearings 22a and 22b by the swing movement of the worm shaft 28 during the installation.

Figure 13:
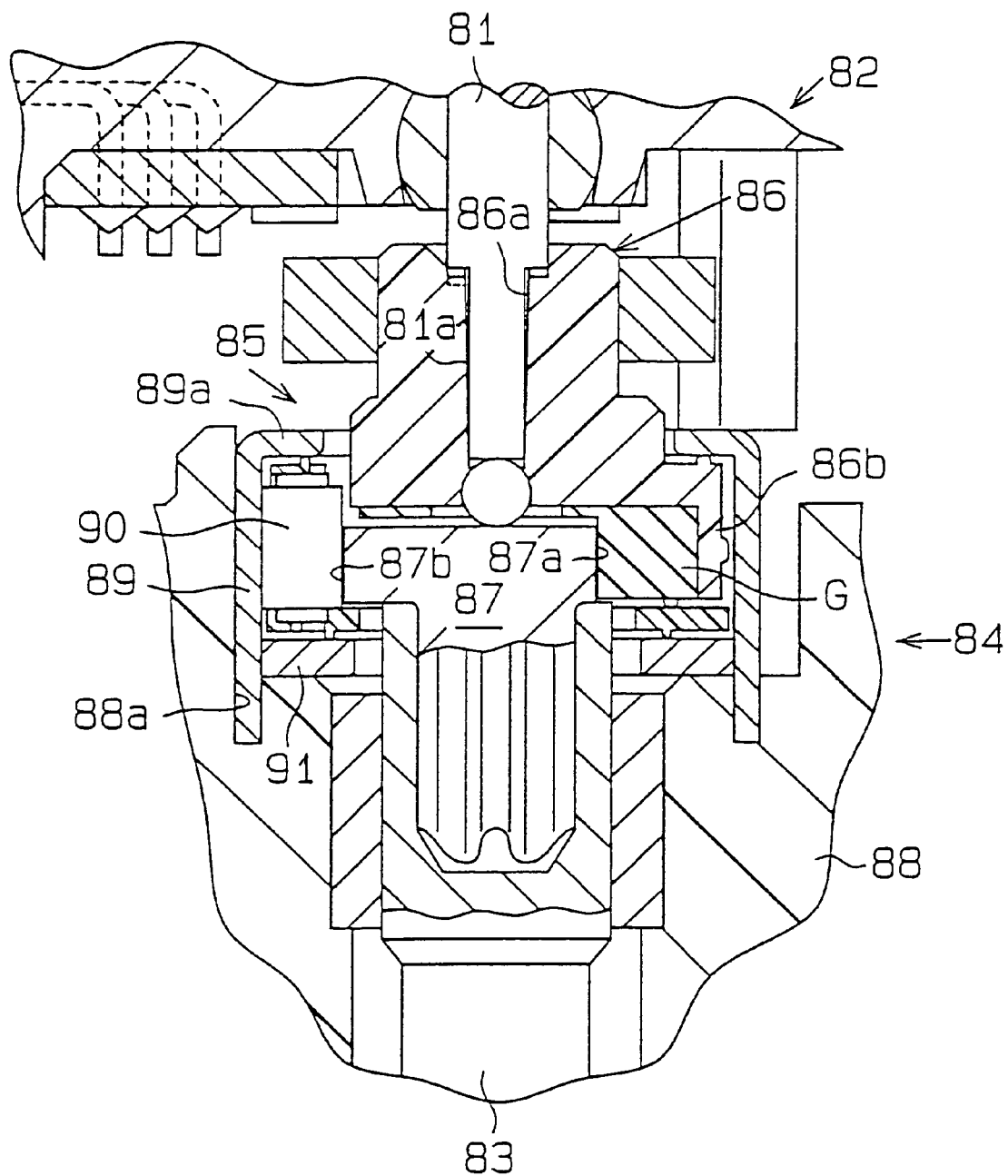
FIG. 13 is an enlarged partial longitudinal cross-sectional view of the previously proposed motor.
Figure 14:
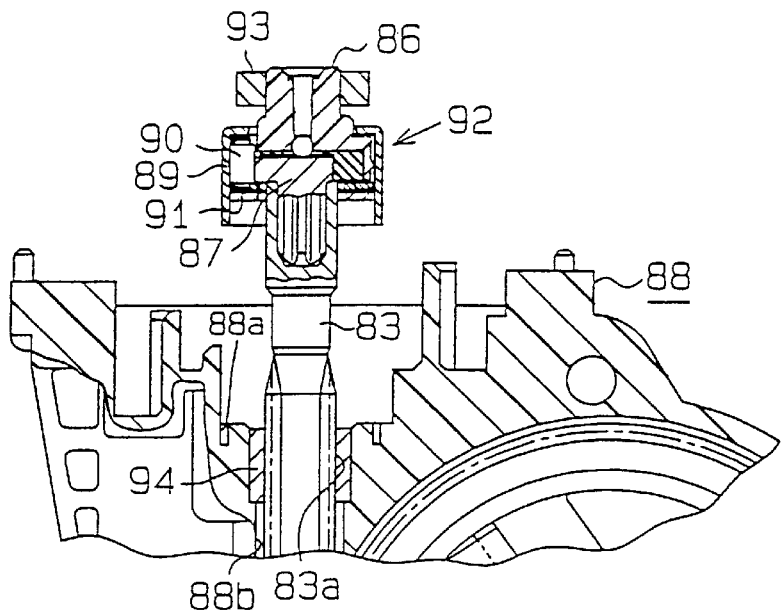
FIG. 14 is a view depicting a method for manufacturing the previously proposed motor.
Figure 15:
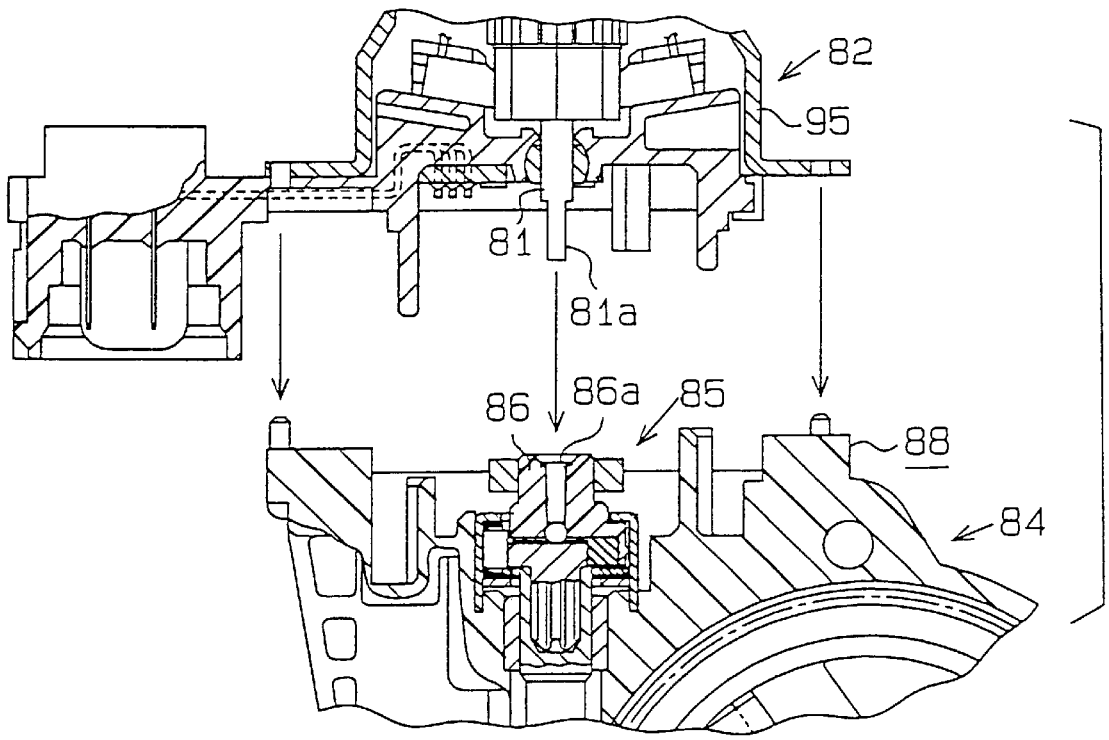
FIG. 15 is another view depicting the method for manufacturing the previously proposed motor.

(2) The above arrangement allows the driving-side rotator 35 to be installed in the gear housing 21 after installation of the components of the clutch C other than the driving-side rotator 35 in the gear housing 21. The driving-side rotator 35 is first installed on the rotatable shaft 6, and the components of the clutch C other than the driving-side rotator 35 are installed in the gear housing 21. Thereafter, the motor main body 2 is secured to the output arrangement 3, and the driving-side rotator 35 is connected to the other components of the clutch C (more specifically, the protrusions 42 are inserted inside of the outer ring 31a). In this way, unlike the previously proposed arrangement (FIG. 13), it is not required to taper the inner surfaces of the recess 86a in such a manner that that the width of the recess 86a increases toward the opening of the recess 86a to facilitate insertion of the protrusion 81a into the recess 86a. Thus, during the operation of the motor upon completion of the assembly, the rotatable shaft 6 and the driving-side rotator 35 are less likely to wobble. As a result, impulsive sound is less likely to be generated during the operation of the motor. Furthermore, durability of the driving-side rotator 35 generally made of a resin material is improved.

Second Embodiment

Figure 9:
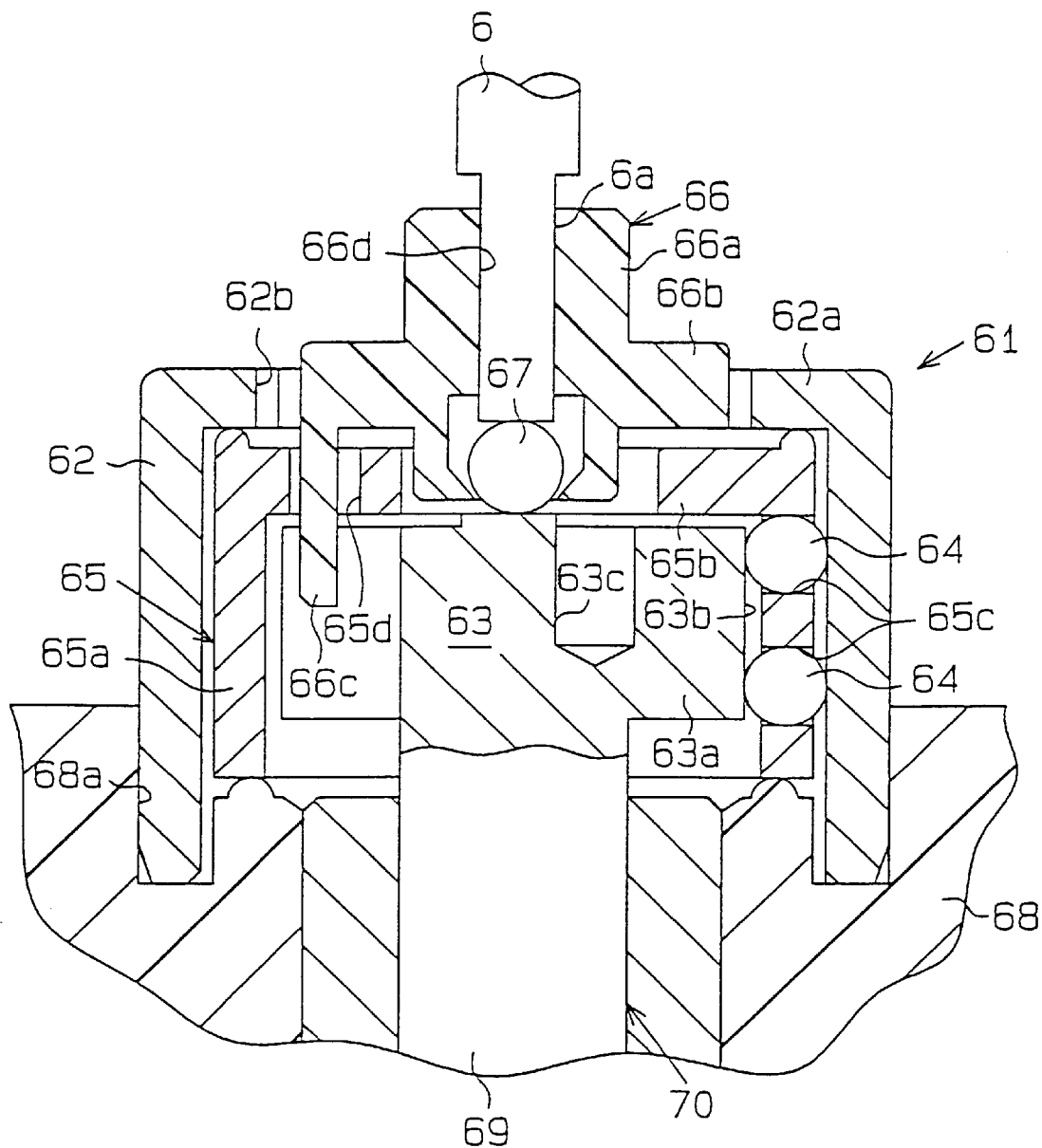
FIG. 9 is a partial longitudinal cross-sectional view of a clutch installed in a motor according to a second embodiment of the present invention.
Figure 10:
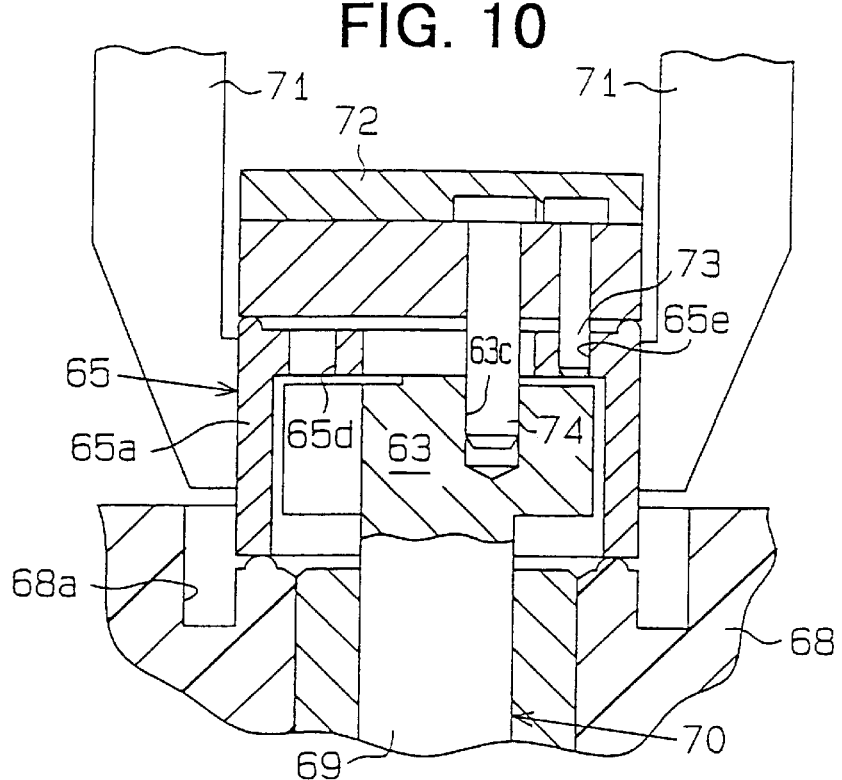
FIG. 10 is a view depicting a method for manufacturing the motor according to the second embodiment.
Figure 11:
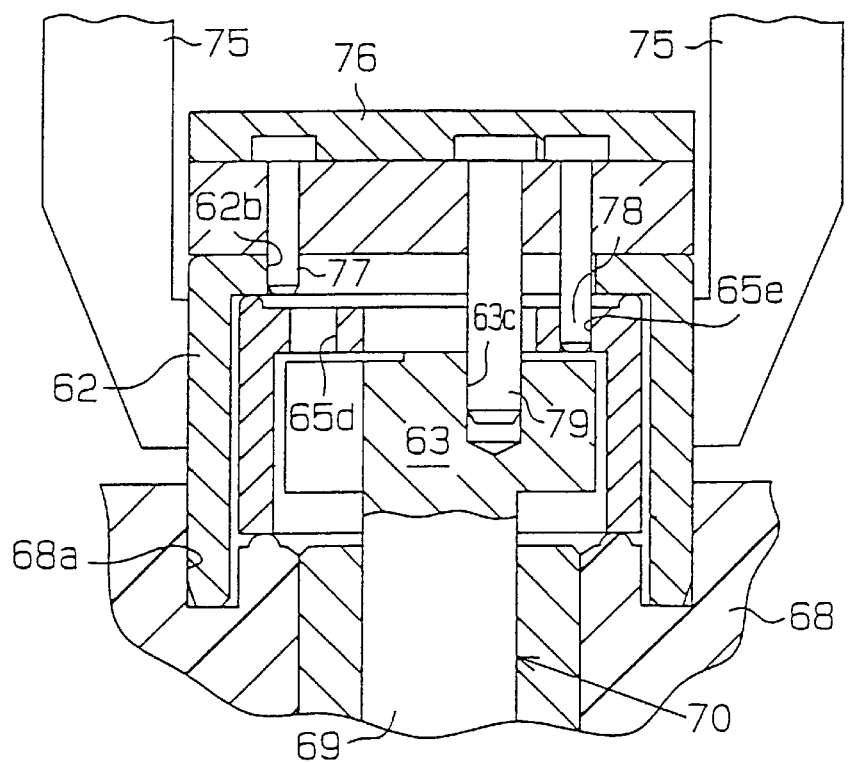
FIG. 11 is another view depicting the method for manufacturing the motor according to the second embodiment.
Figure 12:
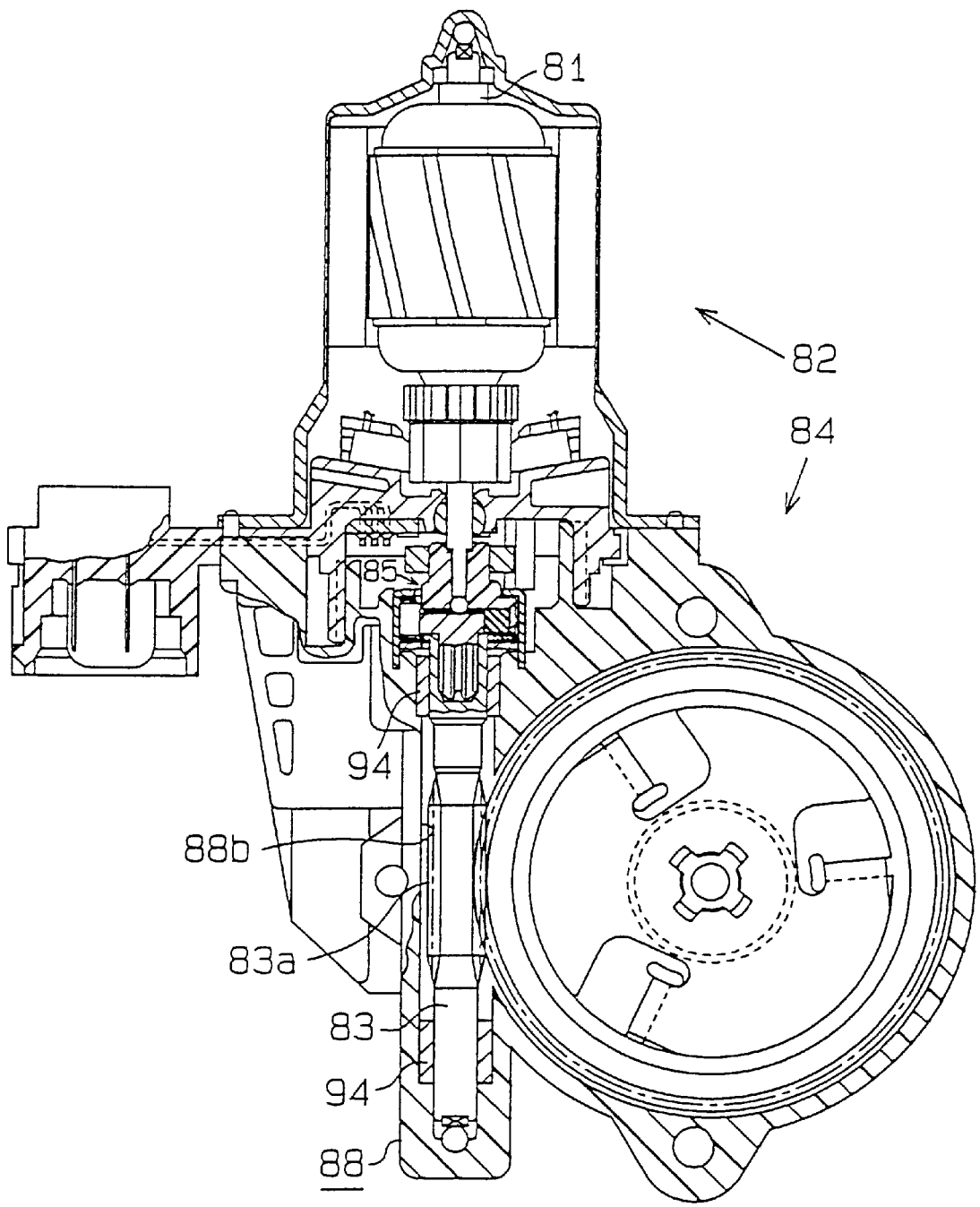
FIG. 12 is a schematic longitudinal cross-sectional view of a previously proposed motor.

A second embodiment of the present invention will be described with reference to FIGS. 9–11. A motor according to the second embodiment is substantially the same as that of the first embodiment except a structure of a clutch 61. Thus, the description and drawings of the entire motor are not indicated for the sake of simplicity, and similar components are designated by similar numerals. FIG. 9 is a partial cross-sectional view of the motor (clutch 61) according to the second embodiment.

The clutch 61 includes a collar 62, a driven-side rotator 63, a plurality of rolling elements 64, a support member 65, a driving-side rotator 66 and a ball 67.

The collar 62 is formed into a generally cylindrical shape, and a base end of the collar 62 is press fitted within a clutch receiving recess 68a formed in the gear housing 68. At a distal end of the collar 62, there is provided an annular disk portion 62a that extends radially inwardly from the distal end of the collar 62. At an inner peripheral edge of the disk portion 62a, there is provided a positioning groove 62b that extends radially outwardly and acts as a positioning portion. An inner diameter of the disk portion 62a is larger than a maximum outer diameter of the driving-side rotator 66.

Like the driven-side rotator 29 (worm member 23) of the first embodiment, the driven-side rotator 63 is integrally molded at a base end of a worm shaft 69 and constitutes a worm member 70 together with the worm shaft 69. Like the driven-side rotator 29 of the first embodiment, the driven-side rotator 63 includes three engaging projections 63a that extend radially outwardly and are spaced at equal angular intervals. A control surface 63b is provided in a radially outer surface of each engaging projection 63a. In a.driving-side rotator 66 side end surface of the driven-side rotator 63, three drive holes 63c (only one is shown in FIG. 9) are provided at equal angular intervals (120 degrees) as positioning portions and also as rotational drive coupling portions. Each drive hole 63c is displaced from an axial center of the driven-side rotator 63 and is recessed in the axial direction.

Each rolling element 64 is formed into a spherical shape. Two axially aligned rolling elements 64 are placed between each control surface 63b and the collar 62.

The support member 65 includes a cylindrical portion 65a and an inward protrusion 65b. The cylindrical portion 65a is formed into a generally cylindrical shape having an outer diameter smaller than an inner diameter of the collar 62. The inward protrusion 65b is annular and extends radially inwardly from one end of the cylindrical portion 65a. Retaining holes 65c are provided in the cylindrical portion 65a at equal angular intervals (120 degrees) to penetrate through the cylindrical portion 65a in the radial direction. Each rolling element 64 is retained in each retaining hole 65c. The rolling elements 64 are spaced at equal angular intervals. Three through holes 65d are formed at equal angular intervals (between the circumferentially spaced adjacent retaining holes 65c) in the inward protrusion 65b. Each through hole 65d is located inward of the disk portion 62a of the collar 62 and extends arcuately in a circumferential direction thereof. As shown in FIG. 10, a circular positioning hole 65e acting as a positioning portion is formed through a portion of the inward protrusion 65b where no through hole 65d is present. In FIG. 10, a portion of a cross-section of the support member 65 where the positioning hole 65e is formed is seen from a different direction with respect to the rest of the support member 65. An inner diameter of the inward protrusion 65b is selected such that the drive holes 63c formed in the driven-side rotator 63 are visible from the axial direction through a center opening of the inward protrusion 65b. One end the cylindrical portion 65a of the support member 65 abuts the disk portion 62a of the collar 62, so that axial movement of the support member 65 is prevented, and the support member 65 is retained within the collar 62.

The driving-side rotator 66 includes a shaft portion 66a, an annular portion 66b and protrusions 66c. The shaft portion 66a is coaxial with the driven-side rotator 63. The annular portion 66b extends radially outwardly from an axially middle part of the shaft portion 66a. The protrusions 66c are arranged at equal angular intervals (120 degrees) to extend in the axial direction from an outer peripheral edge of the annular portion 66b. The ball 67 is held in a distal end (driven-side rotator 63 side end) of the shaft portion 66a, and a portion of the ball 67 that protrudes from the distal end of the shaft portion 66a contacts the driven-side rotator 63. In a base end of the shaft portion 66a, there is provided an annular recess 66d having diametrically opposing flat inner surfaces. The annular protrusion 6a having the diametrically opposing flat outer surfaces formed in the rotatable shaft 6 is fitted within the recess 66d. Each protrusion 66c of the driving-side rotator 66 extends through the corresponding through hole 65d of the support member 65 and is positioned between the engaging projections 63a of the driven-side rotator 63.

The motor 1 having the above-described structure is assembled as follows.

(Worm Shaft Installing Step)

Similar to the first embodiment, the worm member 70 (one-piece body including the worm shaft 69 and the driven-side rotator 63) is installed in the gear housing 68.

(Clutch Installing Step)

The components of the clutch 61 other than the driven-side rotator 63 are installed in the gear housing 68. "The clutch installing step" according to the present embodiment includes "driving-side rotator installing step", "housing-side component installing step", "clutch operation testing step" and "connecting step".

(Driving-side Rotator Installing Step)

Similar to the first embodiment, the driving-side rotator 66 is installed on the rotatable shaft 6.

(Housing-side Component Installing Step)

The components of the clutch 61 other than the driving-side rotator 66 are installed in the gear housing 68.

More specifically, the rolling elements 64 are first received and are held within the support member 65. Then, the support member 65 is placed around the driven-side rotator 63 in such a manner that each rolling element 64 is positioned radially outward of the corresponding control surface 63b. During this process, as shown in FIG. 10, an outer peripheral surface of the support member 65 (cylindrical portion 65a) is first clamped by chuck claws 71 of a manufacturing device (not shown). Then, a work engaging metal block 72 (FIG. 10) acting as a positioning jig of the manufacturing device is moved toward the support member 65 while being rotated to insert a support member pin 73 secured to the work engaging metal block 72 into the positioning hole 65e of the support member 65. Then, as shown in FIG. 10, the support member 65 and the work engaging metal block 72 are moved toward the driven-side rotator 63 while being rotated to insert driven-side rotator pins 74 secured to the work engaging metal block 72 into the corresponding drive holes 63c of the driven-side rotator 63. The support member pin 73 and the driven-side rotator pins 74 are previously arranged in predetermined corresponding positions in the work engaging metal block 72 to correspond with the positioning hole 65e and the drive holes 63c, respectively. By inserting the support member pin 73 and the driven-side rotator pins 74 into the positioning hole 65e and the drive holes 63c, respectively, the support member 65 is correctly positioned with respect to the driven-side rotator 63 in the rotational direction. In this way, with use of the support member pin 73 and the driven-side rotator pins 74, the support member 65 (rolling elements 64) is correctly positioned with respect to the driven-side rotator 63 (control surfaces 63b) in the rotational direction and is also mounted to the driven-side rotator 63.

Then, the collar 62 is press fitted into the clutch receiving recess 68a of the gear housing 68. During this process, as shown in FIG. 11, an outer peripheral surface of the collar 62 is first clamped by chuck claws 75. Then, a work engaging metal block 76 (FIG. 11) acting as a positioning jig is moved toward the collar 62 while being rotated to insert a collar pin 77 secured to the work engaging metal block 76 into the positioning groove 62b of the collar 62. Then, as shown in FIG. 11, the collar 62 and the work engaging metal block 76 are moved toward the support member 65 while being rotated to insert the support member pin 78 and the driven-side rotator pins 79 secured to the work engaging metal block 76 into the positioning hole 65e of the support member 65 and the drive holes 63c of the driven-side rotator 63, respectively. In this way, the collar 62 is press fitted within the clutch receiving recess 68a of the gear housing 68 while the collar 62, the support member 65 (rolling elements 64) and the driven-side rotator 63 (control surfaces 63b) are correctly positioned in the rotational direction with use of the collar pin 77, the support member pin 78 and the driven-side rotator pins 79, respectively. Similar to FIG. 10, in FIG. 11, a portion of a cross-section of the support member 65 where the positioning hole 65e is formed is seen from a different direction with respect to the rest of the support member 65.

(Clutch Operation Testing Step)

After "the housing-side component installing step", an operation test (locking test) of the clutch 61 is conducted. Specifically, drive pins (not shown) constituting an operation testing jig are inserted into the drive holes 63c of the driven-side rotator 63 to directly rotate the driven-side rotator 63 by the drive pins. During this rotation of the driven-side rotator 63, if each rolling element 64 is clamped between the corresponding control surface 63b and the inner peripheral surface of the collar 62, thereby preventing further rotation of the driven-side rotator 63, the clutch 61 is determined to be normal. On the other hand, if each rolling element 64 is not clamped between the corresponding control surface 63b and the inner peripheral surface of the collar 62, thereby allowing continuous rotation of the driven-side rotator 63, the clutch 61 is determined to be abnormal.

(Connecting Step)

After "the driving-side rotator installing step", "the housing-side component installing step" and "the clutch operation testing step", similar to the first embodiment, the motor main body 2 is secured to the output arrangement 3, and the driving-side rotator 66 is connected to the other components of the clutch 61.

The power window system (motor) having the above-described construction operates as follows.

When the motor main body 2 is driven to rotate the rotatable shaft 6, the driving-side rotator 66 (protrusions 66c) rotates integrally with the rotatable shaft 6. Then, each protrusion 66c pushes the corresponding rolling elements 64 via the corresponding support member 65 and also pushes the driven-side rotator 63, so that the driven-side rotator 63 is rotated along with the driving-side rotator 66.

On the other hand, when the motor main body 2 is not actuated, a load applied to the output shaft 25 causes the driven-side rotator 63 (control surfaces 63b) to rotate. Then, when the driven-side rotator 63 is slightly rotated by the load, each rolling element 64 is clamped between the corresponding control surface 63b and the inner peripheral surface of the collar 62 (locked state). Thus, further rotation of the driven-side rotator 63 is prevented, so that the driving-side rotator 66 is not rotated by the driven-side rotator 63.

As described above, even if a large load is applied to the output shaft 25, the rotation of the driven-side rotator 63 is prevented. Thus, the window glass that is connected to the output shaft 25 is effectively prevented from moving upward and downward by its own weight or an external force.

According to the second embodiment, in addition to advantages similar to those described above in the sections (1) and (2) with reference to the first embodiment, the following advantages are achieved.

(3) The drive holes 63c are formed in the driven-side rotator 63, and the driven-side rotator 63 is directly rotated by the drive pins inserted within the corresponding drive holes 63c to conduct the operation test (locking test) of the clutch 61 before the motor main body 2 is secured to the output arrangement 3. Thus, defective products can be found at an earlier stage of the assembling process in comparison to a case where the clutch is tested by rotating the output shaft 25 after the motor main body 2 is secured to the output arrangement 3. As a result, loss of assembling work can be reduced to reduce an assembling cost. Furthermore, in comparison to the case where the clutch is tested by rotating the output shaft 25 after the motor main body 2 is secured to the output arrangement 3, a torque required to rotate the driven-side rotator 63 is reduced. Thus, a size of a clutch testing apparatus can be reduced.

(4) The drive holes 63c, the positioning hole 65e and the positioning groove 62b are formed in the driven-side rotator 63, the support member 65 and the collar 62, respectively.

Furthermore, the driven-side rotator pins 74, 79, the support member pin 73, 78 and the collar pin 77 are inserted into the drive holes 63c, the positioning hole 65e and the positioning groove 62b, respectively, to conduct the positioning and the installation, as described above. Thus, each component 62, 63, 65 is correctly positioned in the rotational direction and is assembled. In this way, there is no substantial problem with respect to the positioning of these components, such as miss-installation of the rolling elements 64 where the rolling elements 64 are not correctly positioned radially outward of the corresponding control surfaces 63b. As a result, the assembling work can be automated.

(5) During the installation of the driven-side rotator 63, the drive holes 63c of the driven-side rotator 63 act as the positioning portions for positioning the driven-side rotator 63 that is achieved by inserting the driven-side rotator pins 74, 79 into the corresponding drive holes 63c. Furthermore, during the operation test of the clutch 61, the drive holes 63c of the driven-side rotator 63 also act as the rotational drive coupling portions for directly driving the driven-side rotator 63 by inserting the drive pins into the corresponding drive holes 63c. Thus, the positioning and the operation test described above can be conducted without constructing the driven-side rotator 63 into a more complicated form.

The above embodiment can be modified as follows.

In each one of the above embodiments, the driving-side rotator 35, 66 is first installed on the rotatable shaft 6. Then, the components of the clutch C, 61 other than the driving-side rotator 35, 66 are installed in the gear housing 21, 68. Thereafter, the motor main body 2 is secured to the output arrangement 3, and the driving-side rotator 35, 66 is connected to the other components of the clutch C, 61. However, this can be modified as follows. That is, the driving-side rotator 35, 66 is first connected to the other components of the clutch C, 61. Then, the motor main body 2 is secured to the output arrangement 3, and the rotatable shaft 6 is connected to the driving-side rotator 35, 66. In such a case, the inner surfaces of the recess 35e, 66d can be tapered such that the width of the recess 35e, 66d increases toward the opening of the recess 35e, 66d. This structure facilitates insertion of the protrusion 6a into the recess 35e, 66d. Thus, the rotatable shaft 6 can be connected the driving-side rotator 35 without necessitating high dimensional precision of these components. Even with this modification, it is possible to accomplish the advantages similar to those described in the above sections (1), (3) and (4).

In each one of the above embodiments the worm member 23, 70 (worm shaft 28, 69) is first accurately positioned in the rotational direction and is inserted into the worm shaft receiving recess 21f. At this time, the worm member 23, 70 is inserted as the one-piece body, so that more accurate positioning of the worm member 23, 70 can be achieved in comparison to the previously proposed motor. Thus, upon installation of the worm wheel 24 in the gear housing 21, 68, the worm shaft 28, 69 can be easily installed in the gear housing 21, 68 without damaging the tooth of the worm wheel 24 or the tooth of the worm 28a of the worm shaft 28, 69. With this arrangement, the assembling procedure of the motor 1 can be varied with a greater degree of flexibility.

In the second embodiment, the operation test (locking test) of the clutch 61 is conducted in "the clutch operation testing step." However, "the clutch operation testing step" can be eliminated. Even with this arrangement, it is possible to accomplish the advantages similar to those described in the above sections (1), (2) and (4).

In the second embodiment, the relative positioning of the driven-side rotator 63, the support member 65 and the collar 62 is carried out with use of the driven-side rotator pins 74, 79, the support member pin 73, 78 and the collar pin 77 in "the housing-side component installing step." However, this relative positioning can be carried out by any other way. For instance, an operator can assemble these components while checking the relative position of each component with his eyes. Even in this way, it is possible to accomplish the advantages similar to those described in the above sections (1) to (3).

In the second embodiment, the driven-side rotator 63, the support member 65 and the collar 62 are installed upon conducting the relative positioning of all these components in "the housing-side component installing step". However, these components can be installed upon conducting the relative positioning of only the driven-side rotator 63 and the support member 65. Even in this way, the rolling elements 64 held by the support member 65 are accurately positioned radially outward of the corresponding control surfaces 63b of the driven-side rotator 63.

In the second embodiment, the drive holes 63c of the driven-side rotator 63 act as both the positioning portions and the rotational drive coupling portions. However, the positioning portions and the rotational drive coupling portions can be separately provided. Even with this arrangement, it is possible to accomplish the advantages similar to those described in the above sections (1)–(4). In this case, the rotational drive coupling portion can be changed into any form as long as it can engage with the corresponding pin or an other type of mating member in the rotational direction. For instance, the rotational drive coupling portion can be a tetragon protrusion protruding from the axial center of the driven-side rotator 63.

In the first embodiment, the driven-side rotator 29 is clamped by chuck claws 52 of the manufacturing device (not shown) and is moved in the axial direction to insert the worm shaft 28 within the first and second bearings 22a and 22b. However, this operation can be manually carried out if it is possible to prevent the worm 28a or the like from contacting the first and second bearings 22a and 22b.

In each one of the above embodiments, the worm shaft 28, 69 and the driven-side rotator 29, 63 are integrally molded together in one-piece to constitute the worm member 23, 70. However, the worm shaft 28, 69 and the driven-side rotator 29, 63 may be separately manufactured and may be then connected together. In this case, only the worm shaft 28, 69 is installed in the gear housing 21, 68 in "the worm shaft installing step." Then, the components of the clutch C, 61 including the driven-side rotator 29, 63 are installed in the housing 21, 68 in "the clutch installing step". Alternative to this, the worm shaft 28, 69 and the driven-side rotator 29, 63 are first secured together to form an integral unit in "the worm shaft installing step", and the integrated worm shaft 28, 69 and driven-side rotator 29, 63 are installed in the gear housing 21, 68. Then, the other components of the clutch C, 61 other than the driven-side rotator 29, 63 are installed in the gear housing 21, 68 in "the clutch installing step."

In the above embodiments, each rolling element 32 is made of the metal material. However, each rolling element 32 (each rolling element 64) can be made of any other appropriate material, such as a resin material. If each rolling element is made of the resin material, noises generated during sliding movement of the rolling element along the collar 31, 62 can be reduced.

In the above embodiments, the present invention is embodied in the motor 1 of the power window system. However, the present invention can be embodied in a motor used in any other type of device.

Additional advantages and modifications will readily occur to those skilled in the art. The invention in its broader terms is therefore, not limited to the specific details, representative apparatus, and illustrative examples shown and described.

What is claimed is:

1. A method for manufacturing a motor, said motor including a motor main body, an output arrangement secured to said motor main body, and a clutch arranged between said motor main body and said output arrangement, said motor main body including a rotatable shaft rotatably supported therein, said output arrangement including a housing and a worm shaft rotatably supported within said housing, said clutch transmitting rotation of said rotatable shaft to said worm shaft and preventing transmission of rotation of said worm shaft to said rotatable shaft, said method comprising steps of:

installing said worm shaft and a driven-side rotator of said clutch in said housing of said output arrangement in such a manner that said worm shaft rotates integrally with said driven-side rotator of said clutch;

installing a driving-side rotator of said clutch on said rotatable shaft in such a manner that said driving-side rotator rotates integrally with said rotatable shaft; and connecting said motor main body to said housing of said output arrangement in such a manner that said driving-side rotator is positioned in generally coaxial relationship with respect to said driven-side rotator and is drivingly engageable with said driven-side rotator.

2. A method according to claim 1, wherein said worm shaft is installed in said housing of said output arrangement prior to installing said driven-side rotator of said clutch in said housing of said output arrangement in said step of installing said worm shaft and said driven-side rotator of said clutch.

3. A method according to claim 1, wherein said worm shaft and said driven-side rotator of said clutch are installed in said housing of said output arrangement as a one-piece member in said step of installing said worm shaft and said driven-side rotator of said clutch.

4. A method according to claim 1, further comprising a step of installing an annular collar and a rolling element of said clutch in said housing of said output arrangement upon installing said driven-side rotator in said housing of said output arrangement before said step of connecting said motor main body to said housing of said output arrangement, wherein:

said collar is installed in said housing in non-rotatable relationship with respect to said housing and surrounds both said driving-side rotator and said driven-side rotator;

said driven-side rotator includes a control surface facing an inner peripheral surface of said collar;

said control surface is spaced from said inner peripheral surface of said collar for a distance that varies along a circumferential direction of said collar;

said rolling element is positioned between said control surface of said driven-side rotator and said inner peripheral surface of said collar;

said rolling element rotates integrally with said driven-side rotator when said driving-side rotator is rotated upon energization of said motor; and said rolling element is clamped between said control surface of said driven-side rotator and said inner peripheral surface of said collar to prevent rotation of said driven-side rotator when said driven-side rotator is rotated by an external force.

5. A method according to claim 4, wherein said step of installing said annular collar and said rolling element of said clutch further includes a step of installing a support member of said clutch in said housing of said output arrangement, wherein said rolling element is first installed in and rotatably supported within said support member prior to being installed in said housing of said output arrangement.

6. A method according to claim 5, wherein said collar and said support member are installed in said housing of said output arrangement while said collar and said support member are correctly positioned with respect to said driven-side rotator using a positioning jig.

7. A method according to claim 6, wherein said collar and said support member are correctly positioned with respect to said driven-side rotator in a rotational direction of said driven-side rotator by engaging said positioning jig with a positioning portion of said collar, a positioning portion of said support member and a positioning portion of said driven-side rotator, respectively.

8. A method according to claim 1, further comprising a step of testing operation of said clutch just before said step of connecting said motor main body to said housing of said output arrangement.

9. A method according to claim 8, wherein said step of testing said operation of said clutch includes steps of:

inserting an operation testing jig along a installing direction of said driving-side rotator, said operation testing jig being engageable with a rotational drive coupling portion of said driven-side rotator to rotate said driven-side rotator;

engaging said operation testing jig with said rotational drive coupling portion; and directly rotating said driven-side rotator by said operation testing jig.

10. A method according to claim 1, further comprising a step of securing a sensor magnet of a rotational sensor to said driving-side rotator before said step of installing said driving-side rotator of said clutch on said rotatable shaft.

11. A method according to claim 10, wherein:

said motor main body includes a Hall IC of said rotational sensor; and when said driving-side rotator of said clutch is installed on said rotatable shaft, said Hall IC is opposed to said sensor magnet.

12. A motor including a motor main body, an output arrangement secured to said motor main body, and a clutch arranged between said motor main body and said output arrangement, said motor main body including a rotatable shaft rotatably supported therein, said output arrangement including a housing and a worm shaft rotatably supported within said housing, said clutch transmitting rotation of said rotatable shaft to said worm shaft and preventing transmission of rotation of said worm shaft to said rotatable shaft, wherein said clutch includes:

a driven-side rotator that rotates integrally with said worm shaft, wherein said driven-side rotator includes a rotational drive coupling portion for engaging with an operation testing jig for testing operation of said clutch;

a driving-side rotator that is positioned in generally coaxial relationship with respect to said driven-side rotator and rotates integrally with said rotatable shaft, said driving-side rotator being drivingly engageable with said driven-side rotator;

an annular collar being received in said housing of said output arrangement in non-rotatable relationship with respect to said housing and surrounding both said driving-side rotator and said driven-side rotator, said driven-side rotator including a control surface facing an inner peripheral surface of said collar, said control surface being spaced-from said inner peripheral surface of said collar for a distance that varies along a circumferential direction of said collar, a smallest inner diameter of said collar being larger than a largest outer diameter of said driving-side rotator, so that said driving-side rotator is axially detachably engageable with said driven-side rotator through said collar; and a rolling element positioned between said control surface of said driven-side rotator and said inner peripheral surface of said collar, said rolling element rotating integrally with said driven-side rotator when said driving-side rotator is rotated upon energization of said motor, said rolling element being clamped between said control surface of said driven-side rotator and said inner peripheral surface of said collar to prevent rotation of said driven-side rotator when said driven-side rotator is rotated by an external force.

13. A motor including a motor main body, an output arrangement secured to said motor main body, and a clutch arranged between said motor main body and said output arrangement, said motor main body including a rotatable shaft rotatably supported therein, said output arrangement including a housing and a worm shaft rotatably supported within said housing, said clutch transmitting rotation of said rotatable shaft to said worm shaft and preventing transmission of rotation of said worm shaft to said rotatable shaft, wherein said clutch includes:

a driven-side rotator that rotates integrally with said worm shaft, wherein [each one of said collar, said support member and] said driven-side rotator includes a positioning portion for engaging with a positioning jig;

a driving-side rotator that is positioned in generally coaxial relationship with respect to said driven-side rotator and rotates integrally with said rotatable shaft, said driving-side rotator being drivingly engageable with said driven-side rotator;

an annular collar being received in said housing of said output arrangement in non-rotatable relationship with respect to said housing and surrounding both said driving-side rotator and said driven-side rotator, said driven-side rotator including a control surface facing an inner peripheral surface of said collar, said control surface being spaced from said inner peripheral surface of said collar for a distance that varies along a circumferential direction of said collar, a smallest inner diameter of said collar being larger than a largest outer diameter of said driving-side rotator, so that said driving-side rotator is axially detachably engageable with said driven-side rotator through said collar; and a rolling element positioned between said control surface of said driven-side rotator and said inner peripheral surface of said collar, said rolling element rotating integrally with said driven-side rotator when said driving-side rotator is rotated upon energization of said motor, said rolling element being clamped between said control surface of said driven-side rotator and said inner peripheral surface of said collar to prevent rotation of said driven-side rotator when said driven-side rotator is rotated by an external force.

14. A motor according to claim 13 wherein said driven-side rotator includes a rotational drive coupling portion for engaging with an operation testing jig for testing operation of said clutch, and said rotational drive coupling portion of said driven-side rotator also acts as said positioning portion of said driven-side rotator.

15. A motor according to claim 13, wherein said clutch further includes a support member for rotatably supporting said rolling element, said support member being rotatably supported within said housing of said output arrangement between said driven-side rotator and said collar.

* * * * *